United States Patent
Endo et al.

(10) Patent No.: US 9,535,511 B2
(45) Date of Patent: Jan. 3, 2017

(54) CHARACTER INPUT DEVICE

(75) Inventors: Kosuke Endo, Minato-ku (JP);
Takamoto Tsuda, Kanagawa (JP);
Yutaka Shiba, Minato-ku (JP);
Hironobu Aoki, Minato-ku (JP);
Hironori Suzuki, Minato-ku (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 358 days.

(21) Appl. No.: 13/462,311

(22) Filed: May 2, 2012

(65) Prior Publication Data

US 2013/0002575 A1    Jan. 3, 2013

Related U.S. Application Data

(60) Provisional application No. 61/502,468, filed on Jun. 29, 2011.

(51) Int. Cl.
*G06F 3/041* (2006.01)
*G06F 3/023* (2006.01)
*G06F 3/0482* (2013.01)
*G06F 3/0486* (2013.01)
*G06F 3/0488* (2013.01)

(52) U.S. Cl.
CPC .......... *G06F 3/0236* (2013.01); *G06F 3/0482* (2013.01); *G06F 3/0486* (2013.01); *G06F 3/0488* (2013.01)

(58) Field of Classification Search
CPC .. G06F 3/04883; G06F 3/0236; G06F 3/0482; G06F 3/0486; G06F 3/0488
USPC .......................................... 715/863; 345/173
See application file for complete search history.

(56) References Cited

U.S. PATENT DOCUMENTS

| | | | |
|---|---|---|---|
| 2008/0202823 A1* | 8/2008 | Won et al. | 178/18.01 |
| 2009/0322692 A1* | 12/2009 | Kim et al. | 345/173 |
| 2010/0013780 A1* | 1/2010 | Ikeda et al. | 345/173 |
| 2010/0194690 A1* | 8/2010 | Wilairat | 345/168 |
| 2010/0313158 A1* | 12/2010 | Lee et al. | 715/769 |
| 2011/0007000 A1* | 1/2011 | Lim | 345/173 |
| 2011/0037775 A1* | 2/2011 | Park | G06F 3/0233 345/592 |
| 2011/0126153 A1* | 5/2011 | Park | 715/810 |

FOREIGN PATENT DOCUMENTS

JP    2011-053853    3/2011

* cited by examiner

*Primary Examiner* — Mark Regn
(74) *Attorney, Agent, or Firm* — Oblon, McClelland, Maier & Neustadt, L.L.P.

(57) ABSTRACT

An information processing apparatus that determines a position of a touch input received at a display of the information processing apparatus, controls the display to display a string of candidate characters for input at a position on the display corresponding to the position of the touch input, detects selection of a desired character from the string of candidate characters, and controls the display to display the desired character in a character input field on the display.

18 Claims, 20 Drawing Sheets

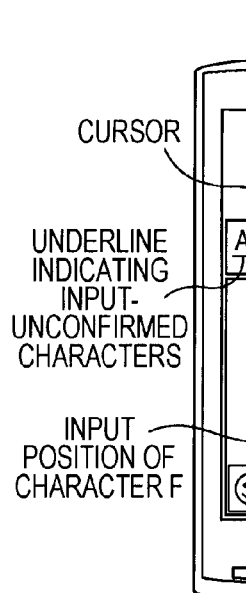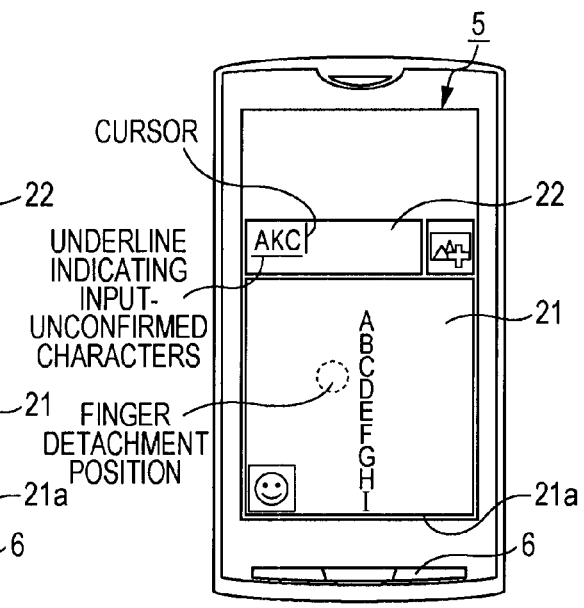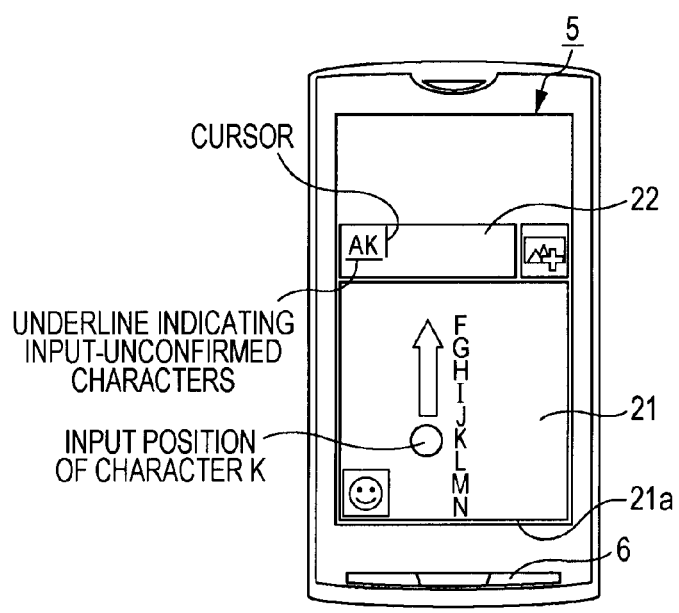

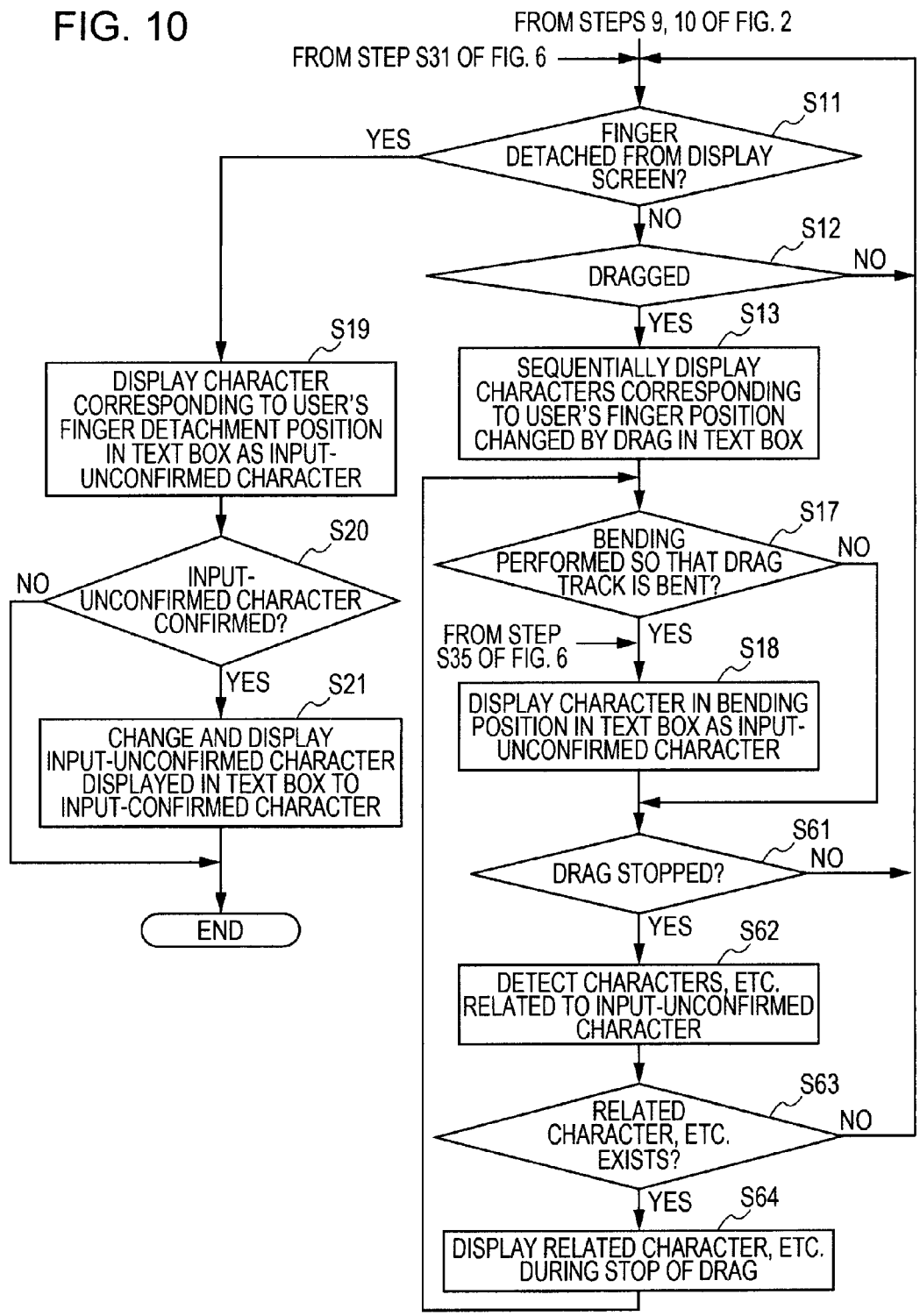

FIG. 14A   FIG. 14B   FIG. 14C
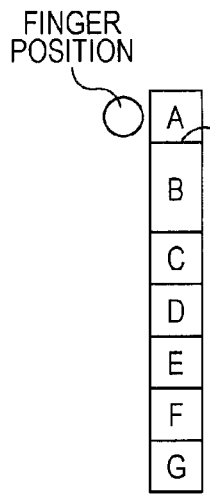
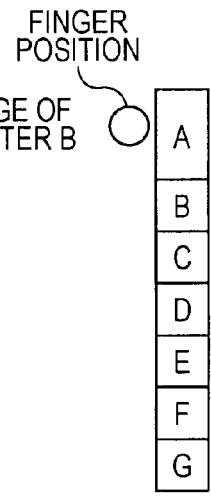
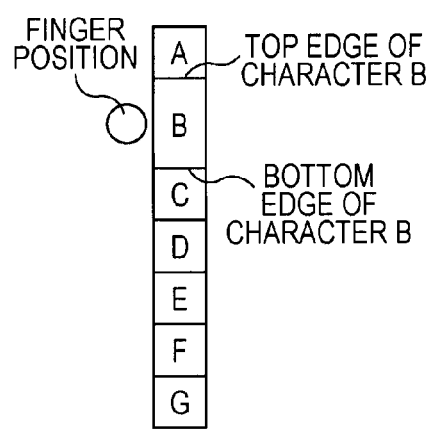
FIG. 14D   FIG. 14E   FIG. 14F
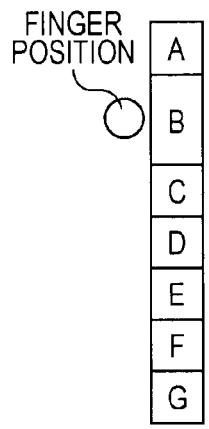
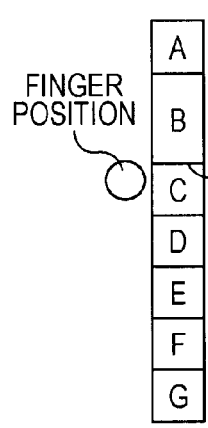
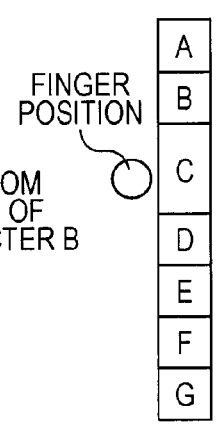

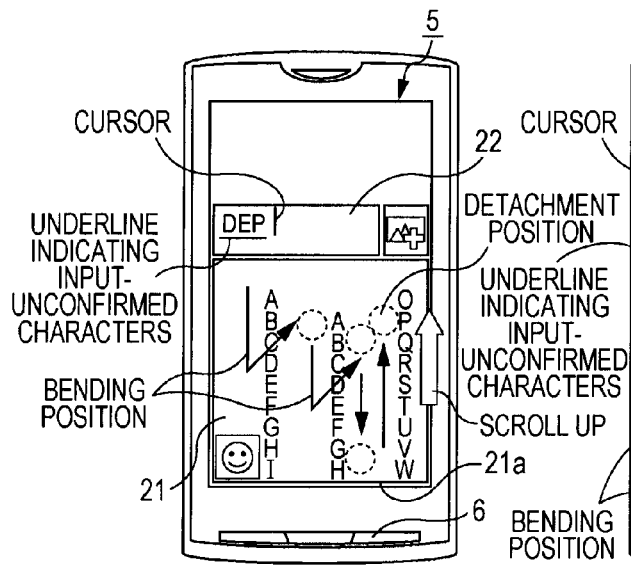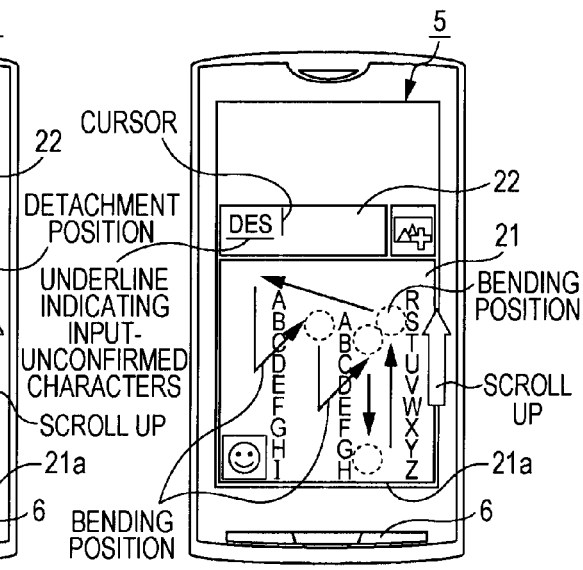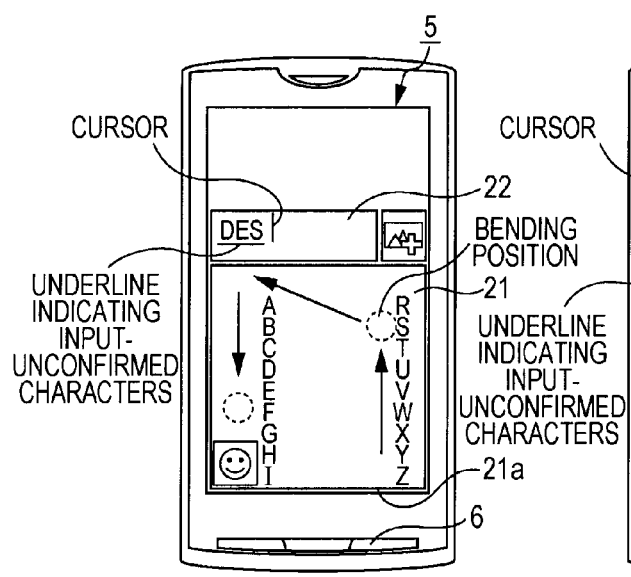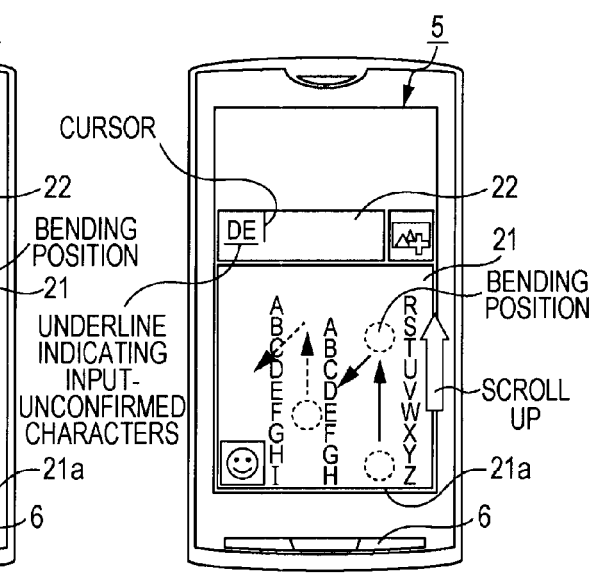

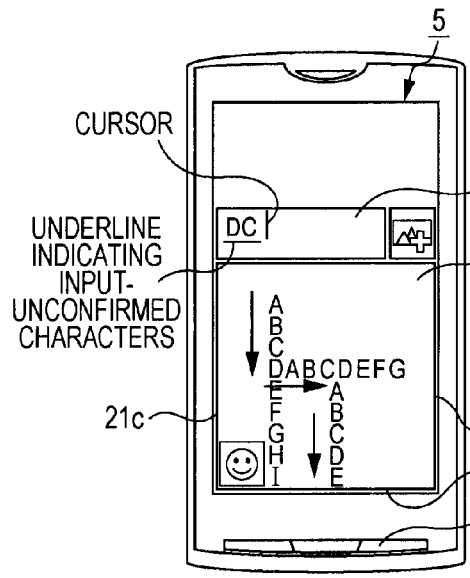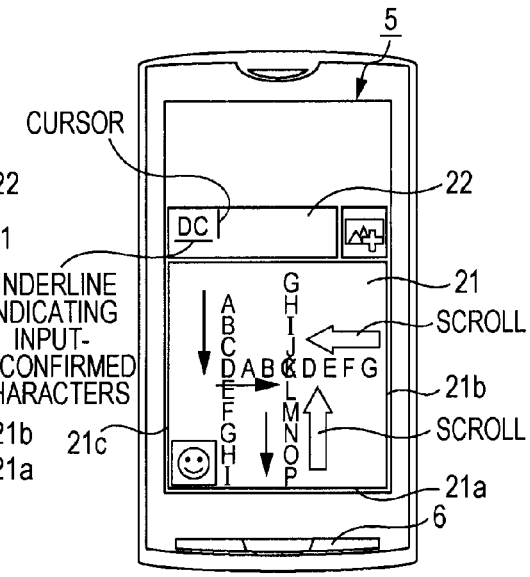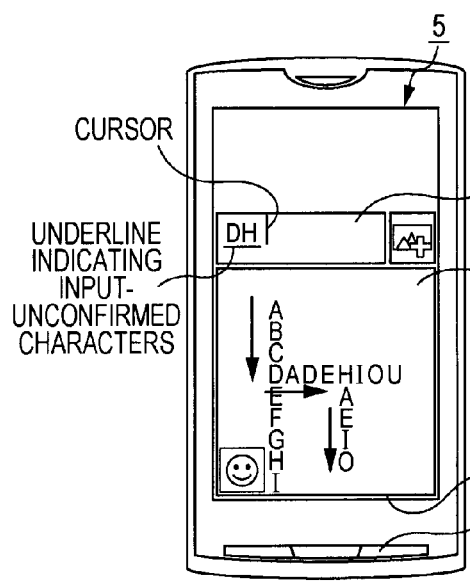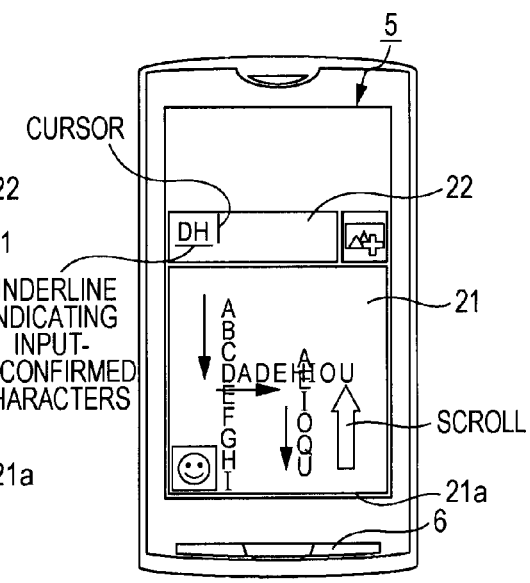

CHARACTER INPUT DEVICE

CROSS REFERENCE TO RELATED APPLICATION

The present application claims the benefit of the earlier filing date of U.S. Provisional Patent Application Ser. No. 61/502,468 filed on Jun. 29, 2011, the entire contents of which is incorporated herein by reference.

BACKGROUND

Field of the Disclosure

The present disclosure relates to a character input device that is suitably applied to electronic apparatuses such as cellular phones, PITS (personal handyphone system) phones, PDA (personal digital assistant) devices, digital camera devices, digital video camera devices, portable game machines, and notebook or desktop personal computers.

Description of Related Art

A character input system described in Japanese Unexamined Patent Application Publication No. 2011-053853 displays, on a television receiver, a first-layer character display screen displaying typical character input buttons of character groups and a second-layer character display screen displaying character input buttons of each character group.

The character input system detects the selection of the first-layer character display screen and the second-layer character display screen in accordance with the track of a finger which traces the touch pad disposed in the remote control device.

The character input system inputs a selected character at the timing when the user detaches the finger from the touch pad.

SUMMARY

The inventors recognize the need to provide a character input device that, in inputting desired characters or the like by touching the character input screen with a finger or the like, can input characters easily and quickly.

According to a first exemplary embodiment, the disclosure is directed to an information processing apparatus that includes a display that receives a touch input; and a processor that determines a position of a touch input on the display, controls the display to display a string of candidate characters for input at a position on the display corresponding to the position of the touch input, detects selection of a desired character from the string of candidate characters; and controls the display to display the desired character in a character input field on the display.

According to another exemplary embodiment, the disclosure is directed to an information processing method performed by an information processing apparatus. The method including determining, by a processor of the information processing apparatus, a position of a touch input received at a display of the information processing apparatus; controlling, by the processor, the display to display a string of candidate characters for input at a position on the display corresponding to the position of the touch input; detecting, by the processor, selection of a desired character from the string of candidate characters; and controlling, by the processor, the display to display the desired character in a character input field on the display.

According to another exemplary embodiment, the disclosure is directed to a non-transitory computer-readable medium including computer program instructions, which when executed by an information processing apparatus, cause the information processing apparatus to perform a method. The method includes determining a position of a touch input received at a display of the information processing apparatus; controlling the display to display a string of candidate characters for input at a position on the display corresponding to the position of the touch input; detecting selection of a desired character from the string of candidate characters; and controlling the display to display the desired character in a character input field on the display.

According to these embodiments of the present disclosure, in inputting desired characters or the like by touching the character input screen with a finger or the like, it is possible to input characters easily and quickly.

BRIEF DESCRIPTION OF THE DRAWINGS

FIG. 7 includes drawings showing an aspect where an input-unconfirmed character is corrected by replacement of the input-unconfirmed character in the cellular phone according to the embodiment.

FIG. 10 is a flowchart showing the related character display process in the cellular phone according to the embodiment.

FIG. 14 includes schematic diagrams showing another example of the process of enlarging the touch area of a character corresponding to a drag position in the cellular phone according to the embodiment.

FIG. 19 includes other schematic diagrams showing the flow of a series of character input processes in the cellular phone according to the embodiment.

FIG. 20 includes other schematic diagrams showing the flow of a series of character input processes in the cellular phone according to the embodiment.

DETAILED DESCRIPTION

The present disclosure is applicable to, for example, cellular phones.

[Configuration of Cellular Phone]

Figure 1:
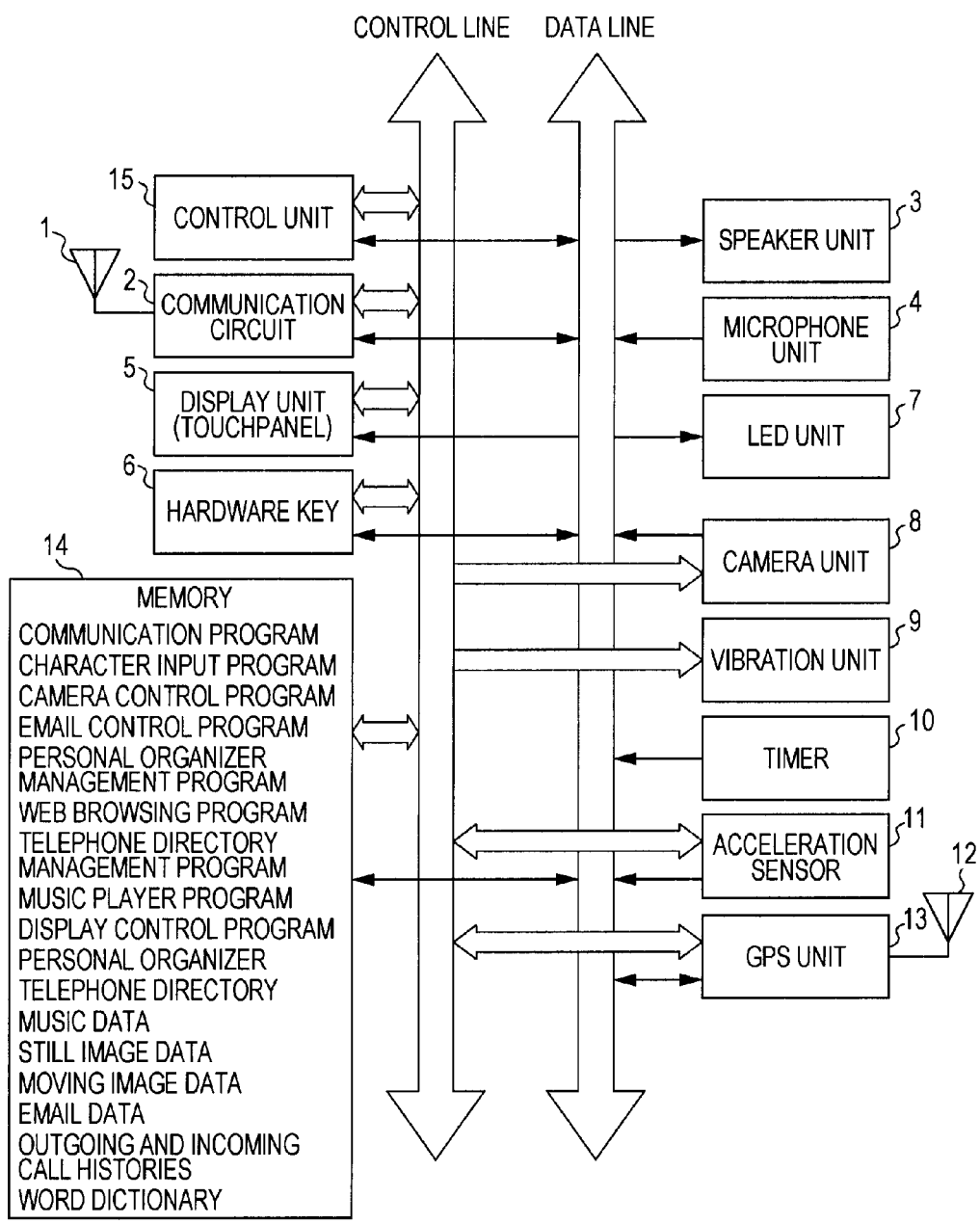
FIG. 1 is a block diagram of a cellular phone according to an embodiment of the present disclosure.

FIG. 1 is a block diagram of a cellular phone according to an embodiment of the present disclosure. As shown in FIG. 1, the cellular phone according to this embodiment includes an antenna 1 and a communication circuit 2 that wirelessly send or receive voice calls, picturephone calls, emails, Web (World Wide Web) data, and the like to or from base stations.

This cellular phone also includes a call-voice speaker 3 for obtaining voice output such as receiving voice, a microphone 4 for collecting sending voice and the like, and a display unit 5, which is used for touches and is a so-called touch panel.

This cellular phone also includes multiple hardware keys 6 physically disposed on the case of the cellular phone.

This cellular phone also includes an LED (light emitting diode) unit 7 for notifying the user of an outgoing call, incoming call, or the like using light, a camera unit 8 for taking a still image or moving image of the desired subject, a vibration unit 9 for notifying the user of an outgoing call, incoming call, or the like by vibrating the case of the cellular phone, and a timer 10 for counting the present time.

This cellular phone also includes an acceleration sensor 11 for detecting a vibration or the like applied to the case of the cellular phone and a GPS (global positioning system) antenna 12 and a GPS unit 13 for detecting the present position of the cellular phone or the position in which a still image or moving image is taken by the camera unit 8.

This cellular phone also includes a memory 14 that stores a communication program for performing wireless communications via the base stations and various application programs and also storing various types of data handled by the application programs and other data and a control unit 15 for controlling the operation of the entire cellular phone.

In addition to the above-mentioned communication program, the memory 14 stores a character input program for enabling input of a desired character, sign, or the like by sliding (dragging) a finger touching the display unit 5 in the form of a touch panel.

The memory 14 also stores a camera control program for controlling taking of a still image or moving image by the camera unit 8. This camera control program includes a viewer program for displaying a taken still image on the display unit 5 or the like.

This viewer program has a function of changing the display magnification by enlarging or reducing a display image, a face recognition function of detecting a face image of the subject (human) shown in a still image, and other functions.

The camera control program also includes a moving-image playback program for displaying a taken moving image on the display unit 5 or the like. This moving-image playback program has a playback-speed change function of controlling a change in the playback speed of a moving image.

The memory 14 also stores an email control program for controlling creation or sending or reception of emails and a personal-organizer management program for managing a personal organizer storing the schedule of the user.

The memory 14 also stores a Web browsing program for viewing a Web page by accessing a server device provided on a predetermined network such as a communication network or the Internet and by sending or receiving information, a telephone directory management program for managing a telephone directory, and a music player program for playing back music data.

The memory 14 also stores a personal organizer storing the desired schedule of the user (schedule data storage area) and a telephone directory storing the names of the friends, acquaintances, and the like of the user, still images (face pictures, etc.), addresses, telephone numbers, email addresses, birth dates, and the like (user's personal information storage area).

The memory 14 also stores music data that is played back according to the music player program, still image data and moving image data that are played back according to the viewer program of the camera control program and the moving image playback program, sent or received email data, sending and reception histories of phone calls and emails, and the like.

The memory 14 also stores word dictionary data including a great amount of word data used to perform the Umlaut process when inputting characters. Details of which will be described later.

The character input program, the camera control program, the email control program, the personal organizer management program, the Web browsing program, the music player program, and the like may be collectively stored in the single memory, 14, as shown in FIG. 1.

Alternatively, the character input program, the camera control program, the email control program, the personal organizer management program, the Web browsing program, the music player program, and the like may be stored in physically separated memories as sets of some programs.

The character input program, the camera control program, the email control program, the personal organizer management program, the Web browsing program, the music player program, and the like may be downloaded via a network and then stored in the above-mentioned memory 14 or memories.

Alternatively, the above-mentioned programs may be read from an external memory and then stored in the above-mentioned memory 14 or memories.

[Operation of Embodiment]
[Outline of Character Input]

In the cellular phone according to this embodiment, when the user presses the touch panel, the display unit 5, with a finger or the like, the control unit 15 detects this press and then displays and controls a string of candidate characters for input on the display unit 5. The user slides the finger to the display position of a character desired to be inputted with the finger touching the display unit 5, that is, performs a so-called drag so as to select a character desired to be inputted.

Subsequently, the user detaches the finger dragged to the display position of the character desired to be inputted from the display unit 5. The control unit 15 displays the character displayed in the display position corresponding to the position in which the finger of the user has been detached, in a text box as an input-unconfirmed character.

To confirm the input of the input-unconfirmed character displayed in the text box, the user presses an enter key disposed on the case of the cellular terminal as the hardware key 6. Upon detection of the press of the enter key, the control unit 15 displays the input-unconfirmed character displayed in the text box as an input-confirmed character. This confirms the input of the input-unconfirmed character displayed in the text box.

Alternatively, when dragging the finger to the display position of the character desired to be inputted with the finger touching the display unit 5, the user bends the finger within a predetermined angle range to select the character desired to be inputted.

Upon detection of this bending, the control unit 15 displays the character displayed in the display position corresponding to the position in which the finger of the user has been bent, in the text box as an input-unconfirmed character. To confirm the input of the input-unconfirmed character displayed in the text box, the user presses the enter key disposed on the case of the cellular terminal as the hardware key 6. Upon detection of the press of the enter key, the control unit 15 displays the input-unconfirmed character displayed in the text box as an input-confirmed character. This confirms the input of the input-unconfirmed character displayed in the text box.

[Character Input Process]

Figure 2:
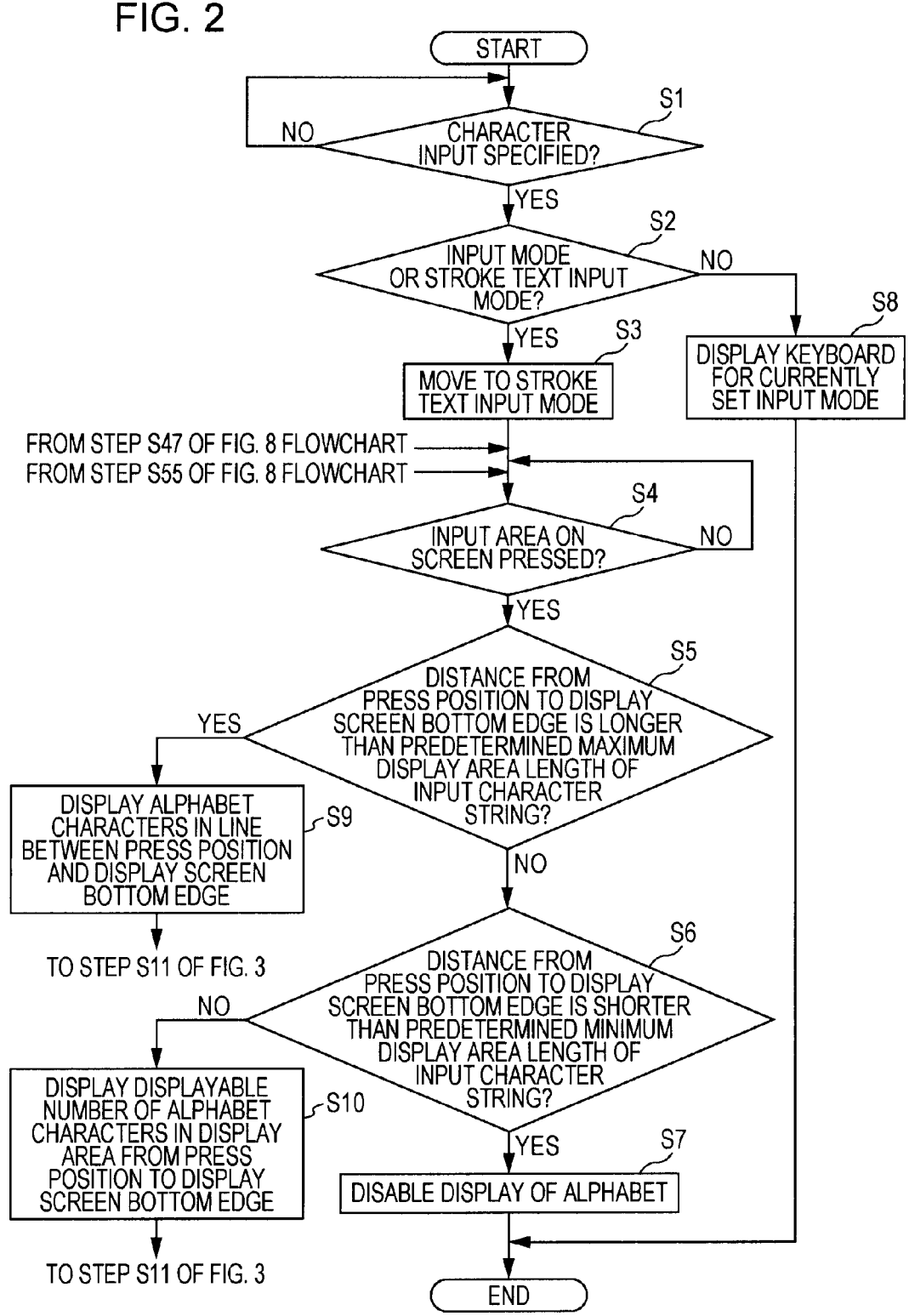
FIG. 2 is a flowchart showing the first-half process of the character input process in the cellular phone according to the embodiment.
Figure 3:
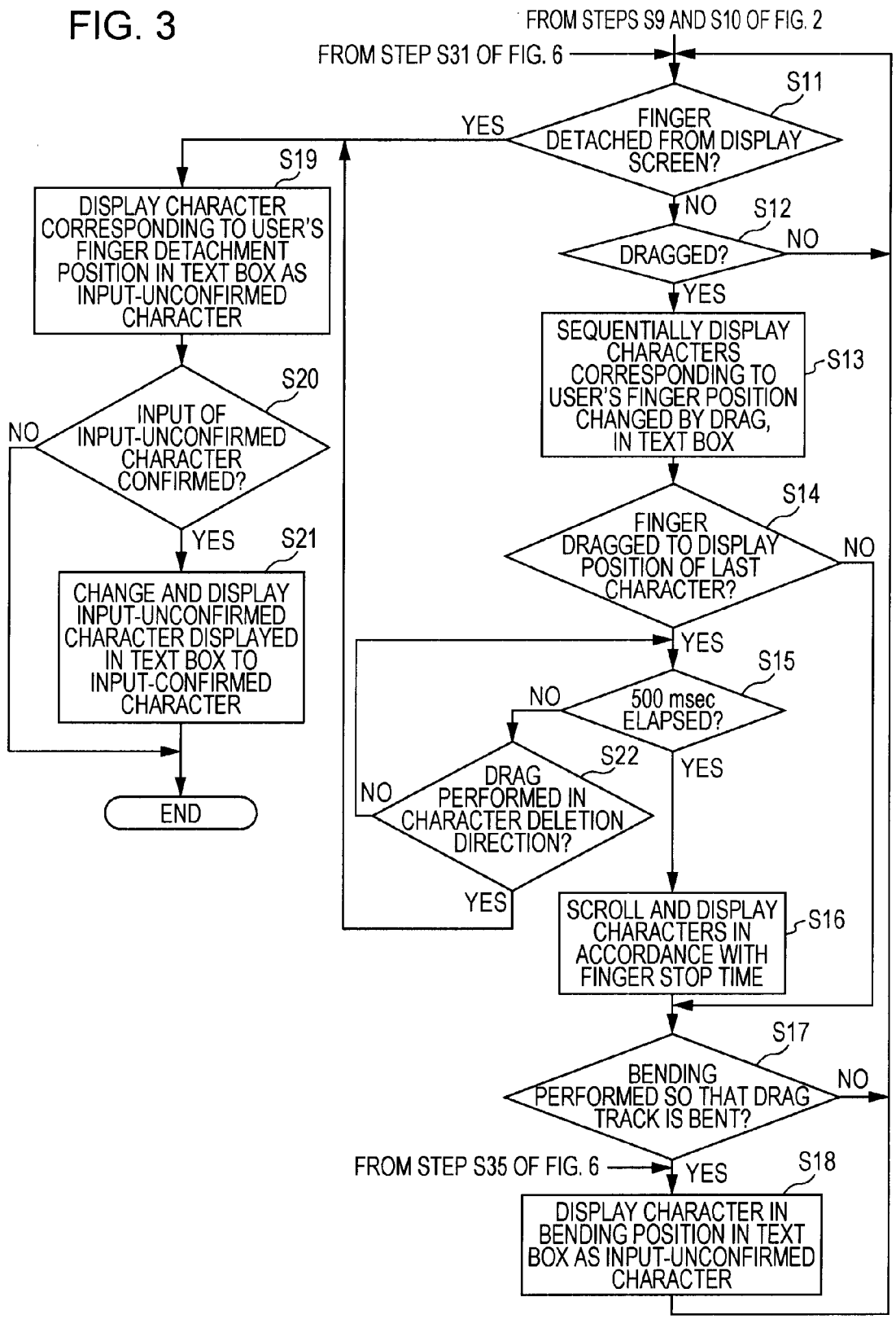
FIG. 3 is a flowchart showing the second-half process of the character input process in the cellular phone according to the embodiment.

The flow of such a character input process is shown in the flowcharts of FIGS. 2 and 3. The flowcharts of FIGS. 2 and 3 show the flow of a series of operations of the character input process. The flowchart of FIG. 2 shows the flow of first-half processes of the character input process. The flowchart of FIG. 3 shows the flow of second-half processes of the character input process.

When the main power supply of the cellular phone according to this embodiment is turned on, the control unit 15 starts the character input process shown in the flowcharts of FIGS. 2 and 3 in accordance with the character input program stored in the memory 14.

In starting the character input process, first, the control unit 15 checks in step S1 whether character input has been specified by the user. The character input specification checked by the control unit 15 in step S1 refers to an operation that the user performs on an object displayed on the display unit 5 so as to specify the input of the desired character.

As an example, if a Web page of a search site is displayed on the display unit 5 in accordance with the Web browsing program, the user touches the input field for characters to be searched for or presses and holds the input field so as to specify the input of characters desired to be searched for. The touch on the input field or press and holding thereof corresponds to the specification of the input of the characters desired to be searched for.

As another example, if a new email creation screen or an email creation screen for replying to a received email is displayed on the display unit 5 in accordance with the email control program, the user touches the electronic address input field, email title input field, or email body input field or presses and holds one of the above-mentioned input fields to specify the input of an email address, email title, or email body. The touch on the input fields or press and holding thereof corresponds to the specification of the input of characters desired to be searched for.

When the control unit 15 detects such character input specification in step S1 of the flowchart of FIG. 2, it advances the process to step S2. In step S2, the control unit 15 determines whether "stroke text input mode," in which a drag is performed on the display unit 5 to input the desired characters, is set as the currently set character input mode.

For example, as the character input mode, the cellular phone according to this embodiment has "standard input mode," in which the user presses QWERTY-layout buttons displayed on the display unit 5 by Romaji input so as to input the desired characters. The cellular phone according to this embodiment also has "stroke text input mode," in which a drag is performed on the display unit 5 to input the desired characters.

The user presets the desired one of "standard input mode" and "stroke text input mode." The control unit 15 stores this setting information in the memory 14.

Thus, when the control unit 15 advances the process to step S2, it refers to the setting information stored in the memory 14 to determine whether "stroke text input mode" is set by the user. If the control unit 15 determines in step S2 that "stroke text input mode" is not set, it advances the process to step S8. The control unit 15 then displays a keyboard for the currently set input mode (in this case, a QWERTY-layout keyboard for standard input mode) on the display unit 5 and completes the character input process shown in the flowcharts of FIGS. 2 and 3. In this case, the user presses the QWERTY-layout keyboard to input the desired characters by Romaji input.

In contrast, if the control unit 15 determines in step S2 that "stroke text input mode" is set, it moves to stroke text input mode through step S3.

Figure 4A:
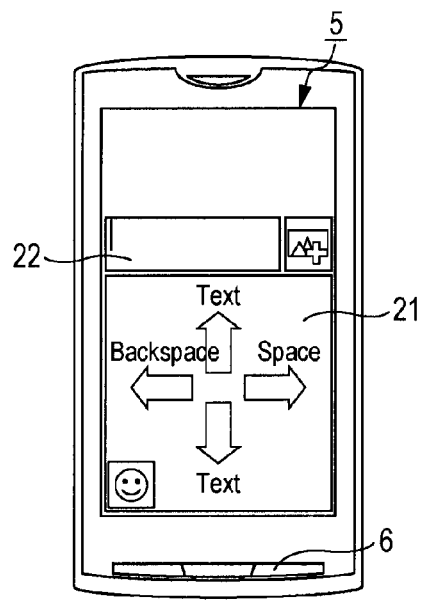
FIG. 4 includes drawings showing an example display of candidate characters for input in the cellular phone according to the embodiment.

When the control unit 15 moves to "stroke text input mode," it displays on the display unit 5 an input area 21, which the user uses to input the desired characters, and a text box 22 for displaying characters inputted through the input area 21, as shown in FIG. 4(a). The example of FIG. 4(a) is an example where the control unit 15 sets a lower about ⅔-area of the display unit 5 as the input area 21 and sets the text box 22 on the remaining ⅓-area thereof.

When the control unit 15 moves to "stroke text input mode," it displays arrow objects indicating drag directions, the vertical and lateral directions, and characters indicating functions corresponding to drags in the arrow directions and enters into a user input standby state, as shown in FIG. 4(a). The control unit 15 then advances the process to step S4.

The example shown in FIG. 4(a) shows that a drag according to the upward arrow or downward arrow results in character input (TEXT input). The example shown in FIG. 4(a) also shows that a right drag results in insertion of a double-width or single-width space between characters displayed in the text box 22, at the top of the document, or in other places. The example shown in FIG. 4(a) also shows that a left drag results in deletion (backspace) of a character displayed in the text box 22.

Figure 4B:
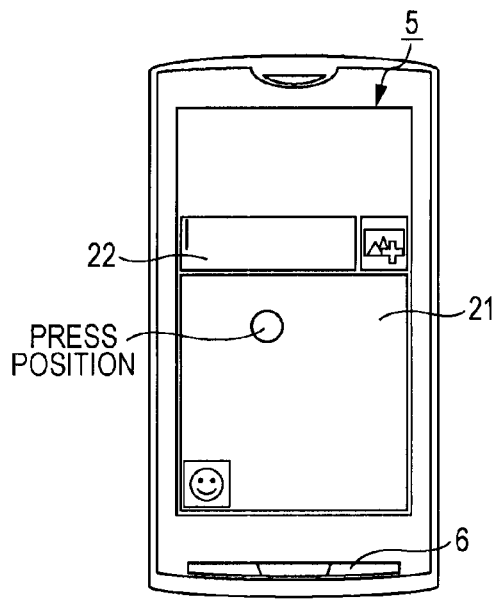

Next, in this cellular terminal, the user presses the input area on the display unit 5 to specify the start of character input. For this reason, when the control unit 15 moves to "stroke text input mode," it checks in step S4 whether the input area 21 has been pressed. For example, as shown in FIG. 4(b), when the control unit 15 detects a touch, such as a slight press with a finger tip, on a small area of the input area 21 continuously for a predetermined time, it determines that the input area 21 has been pressed and advances the process to step S5.

The control unit 15 detects a press in any position on the input area 21. Thus, the user can specify the start of character input by pressing the desired position on the input area 21.

Figure 4C:
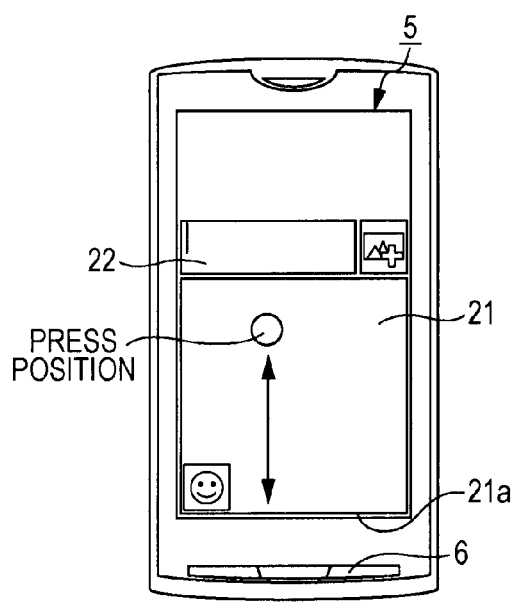
Figure 4D:
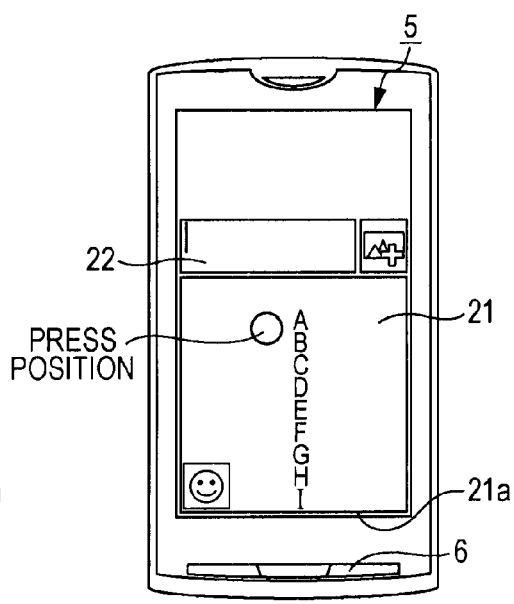

In step S5, the control unit 15 determines whether the distance from the press position on the input area 21 to a bottom edge 21a of the display area, as shown by the bold vertical direction arrow in FIG. 4(c), is longer than the predetermined maximum display area length of an inputted character string.

Specifically, in displaying characters "A" to "Z" of predetermined font size in a line at equal intervals in the input area 21, the distance from the display position of the character "A" to the display position of the character "Z" can be previously calculated. The memory 14 is storing this previously calculated distance from the display position of the character "A" to the display position of the character "Z" as the maximum alphabet display area length.

Likewise, in displaying hiragana characters "a" to "N" in a line at equal intervals in the order of the Japanese 50 phonetic sounds, the distance from the display position of the character "a" to the display position of the character "N" can be previously calculated. The memory 14 is storing this previously calculated distance from the display position of the character "a" to the display position of the character "N" as the maximum hiragana display area length.

Hereafter, to avoid complicated explanation, the case where alphabet characters are inputted will be described.

In step S5, the control unit 15 compares the distance from the press position on the input area 21 to the bottom edge 21a of the display area with data indicating the maximum display area length stored in the memory 14 as described above. Based on the comparison, the control unit 15 determines whether the characters "A" to "Z" of predetermined font size can be displayed in a line at equal intervals.

If the control unit 15 determines that the distance from the press position on the input area 21 to the bottom edge 21a of the display area is equal to or longer than the maximum alphabet display area length stored in the memory 14, it advances the process to step S9.

In step S9, the control unit 15 displays the characters "A" to "Z" of predetermined font size in a line at equal intervals in list form between the press position on the input area 21 and the bottom edge 21a of the display area and advances the process to step S11 of the flowchart of FIG. 3.

In contrast, if the control unit 15 determines that the distance from the press position on the input area 21 to the bottom edge 21a of the display area is shorter than the maximum alphabet display area length stored in the memory 14, it advances the process to step S6.

When it advances the process to step S6, the control unit 15 determines whether the distance from the press position on the input area 21 to the bottom edge 21a of the display area is shorter than a predetermined minimum display area length of an inputted character string.

That is, when the input area 21 is pressed, it is preferable to display some, e.g., at least three candidate characters for input using this press position as the top.

However, if the distance from the press position on the input area 21 to the bottom edge 21a of the display area is extremely short, it is difficult to display the minimum number, e.g., three of candidate characters for input.

In displaying, for example, three alphabet characters of predetermined font size in a line at equal intervals in the input area 21, the distance from the display position of the character "A" to the display position of "C" can be previously calculated. The memory 14 is storing this previously calculated distance from the display position of the character "A" to the display position of the character "C" as the minimum alphabet display area length (The same goes for hiragana characters and the like).

In the above-mentioned step S6, the control unit 15 compares the distance from the press position on the input area 21 to the bottom edge 21a of the display area with data indicating the minimum display area length stored in the memory 14 as described above. Based on the comparison, the control unit 15 determines whether the minimum number, e.g., three of candidate characters for input can be displayed.

If the control unit 15 determines that the distance from the press position on the input area 21 to the bottom edge 21a of the display area is shorter than the minimum alphabet display area length stored in the memory 14, it advances the process to step S7.

The fact that the distance from the press position on the input area 21 to the bottom edge 21a of the display area is shorter than the minimum alphabet display area length stored in the memory 14 means that it is difficult to display the minimum number of candidate characters for input.

In such a case, in step S7, the control unit 15 determines that the user has caused an input error and disables the display of candidate alphabet characters for input. The control unit 15 then completes the character input process shown in the flowcharts of FIGS. 2 and 3.

In this case, the user again presses a desired position on the input area 21 to again specify the start of character input. When the user again specifies the start of character input, the control unit 15 compares the distance from the press position on the input area 21 to the bottom edge 21a of the display area with the maximum and minimum display area lengths, as described above. Based on the comparison result, it performs the above-mentioned processes.

If the distance from the press position on the input area 21 to the bottom edge 21a of the display area is shorter than the minimum alphabet display area length stored in the memory 14, the control unit 15 may indicate the inappropriateness of the press position to the user by displaying an error message reading, for example, "Press a little higher position." In this case, according to this error message, the user again presses a desired position on the input area 21 to again specify the start of character input. When the user again specifies the start of character input, the control unit 15 compares the distance from the press position on the input area 21 to the bottom edge 21a of the display area with the maximum and minimum display area lengths. Based on the comparison result, it performs the above-mentioned processes.

If the control unit 15 determines in the above-mentioned step S6 that the distance from the press position on the input area 21 to the bottom edge 21a of the display area is equal to or longer than the minimum display area length, it advances the process to step S10.

In step S10, the control unit 15 displays a number of alphabets characters displayable between the press position on the input area 21 to the bottom edge 21a of the display area.

Specifically, since the cellular phone is configured to display characters of predetermined font size at equal intervals, the size of the display area required to display one character is previously known. For this reason, when it advances the process to step S10, the control unit 15 divides the distance from the press position on the input area 21 to the bottom edge 21a of the display area by a distance corresponding to the size of the display area required to display one character. Thus, the control unit 15 detects the number of characters displayable between the press position and the bottom edge 21a of the display area.

The control unit 15 then sequentially displays alphabet characters corresponding to the detected character number in a line from the press position toward the lower edge 21a of the display area, as shown in FIG. 4(*d*). When the control unit 15 displays the displayable number of characters in this way, it advances the process to step S11 of FIG. 3.

The example shown in FIG. 4(*d*) is a display example where the distance between the press position and the bottom edge 21a of the display area is a distance where the characters "A" to "I" can be displayed. In this case, the control unit 15 sequentially displays the characters "A" to "I" in a line from the press position serving as the top toward the bottom edge 21a of the display area.

Next, when the control unit 15 advances the process to step S11 of the flowchart of FIG. 3 through step S9 or step S10 of the flowchart of FIG. 2, it detects the operation state on the input area 21 to determine whether the finger of the user has been detached from the input area 21.

That is, the cellular phone according to this embodiment recognizes a character displayed in a position on the input area 21 from which the finger of the user has been detached, as a character whose input has been specified by the user. When the control unit 15 detects that the finger of the user has been detached from the input area 21, it advances the process to step S19 of the flowchart of FIG. 3.

In step S19, for example, as shown in FIG. 5(*a*), the control unit 15 displays the character displayed in the position in which the finger of the user has been detached from the input area 21, in the text box 22 as a character whose input has been specified but not confirmed by the user (input-unconfirmed character).

The example shown in FIG. 5(*a*) is an example where the user has detached the finger from the input area 21 in the display position of the character "A." In this case, the control unit 15 recognizes that the input of the character "A" displayed in the position in which the user has detached the finger from the input area 21 has been specified. The control unit 15 then displays the character "A" in the text box 22 as the above-mentioned input-unconfirmed character.

The underline attached to the bottom of the character "A" shown in the text box 22 of the FIG. 5(*a*) indicates that the character "A" is an input-unconfirmed character, whose input has not been confirmed yet.

In confirming the input of an input-unconfirmed character, the cellular phone according to this embodiment confirms the input of the input-unconfirmed character, for example, by pressing an enter key disposed as the hardware key 6 or software key.

For this reason, the control unit 15 checks in step S20 whether the enter key has been pressed to determine whether the input of the input-unconfirmed character has been confirmed. When the control unit 15 detects this input confirmation, it advances the process to step S21. As shown in FIG. 5(*b*), the control unit 15 disables the display of the underline which has been displayed below the input-unconfirmed character thus far, so as to display the input-unconfirmed character as an input-confirmed character. The control unit 15 then completes the character input process shown in the flowcharts of FIGS. 2 and 3.

In inputting a desired character next to the above-mentioned input-confirmed character, the user again presses a desired position on the input area 21 with the finger or the like to specify the start of character input to input the desired character. The control unit 15 displays the input-unconfirmed character or input-confirmed character thus inputted next to the input-confirmed character confirmed at the last character input.

In contrast, if the control unit 15 does not detect the input confirmation of the input-unconfirmed character in step S20, it leaves the input-unconfirmed character in the text box 22 unconfirmed and completes the character input process shown in the flowcharts of FIGS. 2 and 3.

In inputting a desired character next to the above-mentioned input-unconfirmed character, the user again presses a desired position on the input area 21 with the finger or the like to specify the start of character input to input the desired character. The control unit 15 displays the input-unconfirmed character thus inputted next to the input-unconfirmed character inputted at the last character input. When the control unit 15 detects input confirmation such as a press of the above-mentioned enter key, it displays the input-unconfirmed character as an input-confirmed character.

In this cellular phone, the user moves, that is, drags the finger touching the input area 21 to the display position of the character desired to be inputted along the display direction of the characters so as to input the desired character.

Thus, when the control unit 15 determines in the above-mentioned step S11 that the finger of the user has not been detached from the input area 21, it advances the process to step S12 and checks whether the above-mentioned drag has been performed by the user, in accordance with the operation state of the input area 21.

When the control unit 15 detects that the drag has been performed by the user, it advances the process to step S13 and sequentially displays characters corresponding to the position of the finger of the user changed by the drag, in the text box 22.

Thus, for example, when the user drags the finger from the character "A" to the character "G," the character displayed in the text box 22 is changed in the order of A, B, C, D, E, F, and G.

The character displayed in the text box 22 is sequentially changed according to the drag in this example. Alternatively, when the drag is stopped for a predetermined time, a character corresponding to the stop position may be displayed in the text box 22. For example, if the finger is dragged from the character "A" and is stopped in the position of the character "D" for a predetermined time, the control unit 15 displays the character "D" next to the character "A" in the text box 22 without displaying the characters "B" and "C."

Next, the control unit 15 advances the process to step S14 and determines whether the finger of the user has been dragged to the display position of the last character displayed in the input area 21, as shown in FIG. 5(*c*). The example shown in FIG. 5(*c*) shows an example where the characters "A" to "I" are displayed in the input area 21 and where the finger of the user has been dragged to the display position of the character "I," which is the last character in this case.

When the control unit 15 determines in step S14 that the finger has not been dragged to the display position of the last character, it advances the process directly to step S17. In contrast, when the control unit 15 determines in step S14 that the finger has been dragged to the display position of the last character, it advances the process to step S15.

When the control unit 15 determines that the finger has been dragged to the display position of the last character, it determines in step S15 whether a time of, e.g., 500 msec has elapsed since the positioning of the finger of the user in the display position of the last character. It also determines in step S22 whether the finger of the user has been detached from the input area 21.

When the control unit 15 determines in step S22 that the finger of the user has been detached from the input area 21, it advances the process to step S19. The control unit 15 displays a character displayed in the position from which the finger of the user has been detached, in the text box 22 as an input-unconfirmed character, as described above. That is, in the example shown in FIG. 5(c), the character "I" is displayed in the text box 22, since the finger of the user has been detached from the display position of the last character.

Figure 5A:
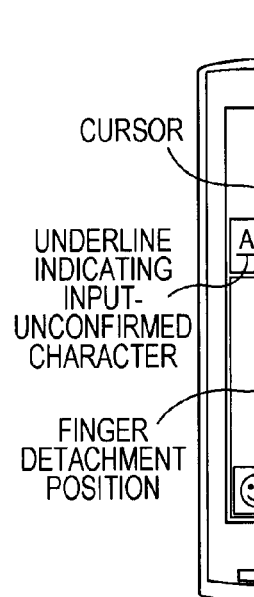
FIG. 5 includes drawings showing an example display of candidate characters for input corresponding to a drag performed by the user in the cellular phone according to the embodiment.
Figure 5B:
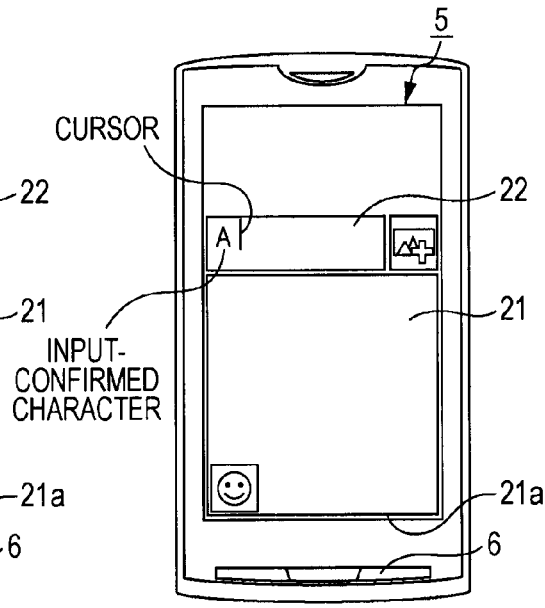
Figure 5C:
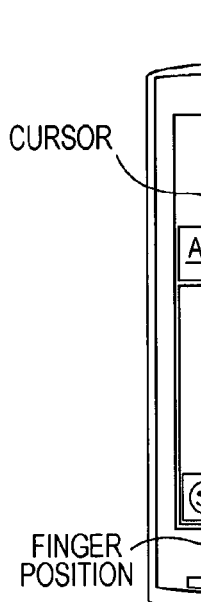
Figure 5D:
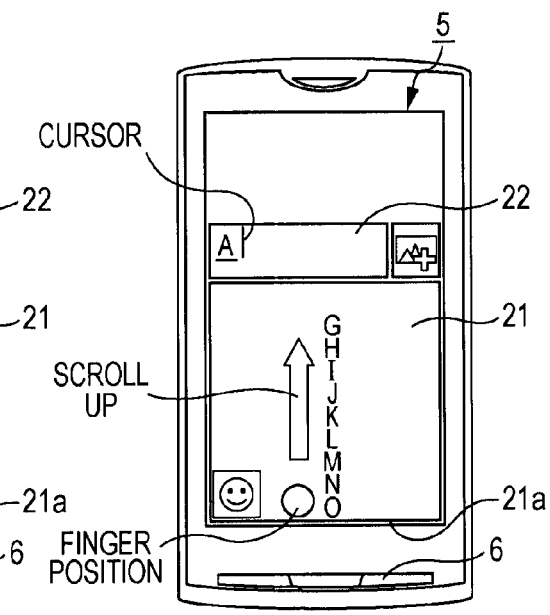

In contrast, when the control unit 15 detects in step S15 that a time of 500 msec has elapsed since the positioning of the finger of the user in the display position of the last character, it advances the process to step S16. The control unit 15 sequentially scrolls and displays characters following the last character in the input area 21 in accordance with the time during which the finger of the user is stopped, as shown in FIG. 5(d). The example shown in FIG. 5(d) is an example where characters "J," "K," "L," "M," "N," and "O" following the character "I" are sequentially scrolled and displayed in accordance with the time during which the finger of the user is stopped.

Note that the scroll process described in steps S14 to S16 and step S22 is a process performed in cases where some of all characters are displayed in the input area 21. That is, the above-mentioned scroll process is a process performed in cases where some of all characters are displayed, such as the case where the characters A to I of the alphabet characters A to Z are displayed.

As described above, in the cellular phone according to this embodiment, the user inputs a desired character by dragging the finger to the display position of the desired character and detaching the finger from the input area 21 in the display position of the desired character.

Alternatively, in the cellular phone according to this embodiment, the user can input a desired character by dragging the finger to the desired character and bending it within a predetermined angle range in the display position of the desired character.

Thus, when the control unit 15 advances the process to step S17, it determines whether the finger has been bent so that the track of the drag is bent. The control unit 15 always checks the direction of the drag by checking the operation state of the input area 21. When the control unit 15 detects that the finger of the user has been bent within the range of, e.g., ±60 angle on the left and right sides of the track of the drag, it determines that the finger has been bent and advances the process to step S18.

When the control unit 15 advances the process to step S18, it displays a character displayed in the position in which the finger has been bent, in the text box 22 as an input-unconfirmed character. The control unit 15 then returns the process to step S11 and repeatedly performs the above-mentioned processes.

The methods for inputting characters in the cellular phone according to this embodiment are as follows.

In the first input method, first, the user presses the input area 21. Thus, alphabet characters are displayed in a line. The user then drags the finger pressing the input area 21 to the display position of a desired character and then detaches the finger from the input area 21. Thus, a character displayed in the position from which the user has detached the finger is displayed in the text box 22 as an input-unconfirmed character.

In the second input method, the user presses the input area 21 to display alphabet characters in a line and drags the finger pressing the input area 21 to the display position of a character desired to be inputted of the displayed alphabet characters. When the user drags the finger to the display position of the character desired to be inputted, the user bends the finger within the angle range of, e.g., ±60° on the left and right sides of the track of the drag. Thus, the character displayed in the position in which the user has bent the finger is displayed in the text box 22 as an input-unconfirmed character.

As described above, the user confirms the input of the input-unconfirmed character displayed in the text box 22 by operating the enter key disposed as the hardware key 6 or software key.

[Replacement of Input-unconfirmed Character]

In the cellular phone according to this embodiment, when a character displayed in the text box 22 is an input-unconfirmed character, which has not been confirmed yet, the user can replace this input-unconfirmed character again.

Figure 6:
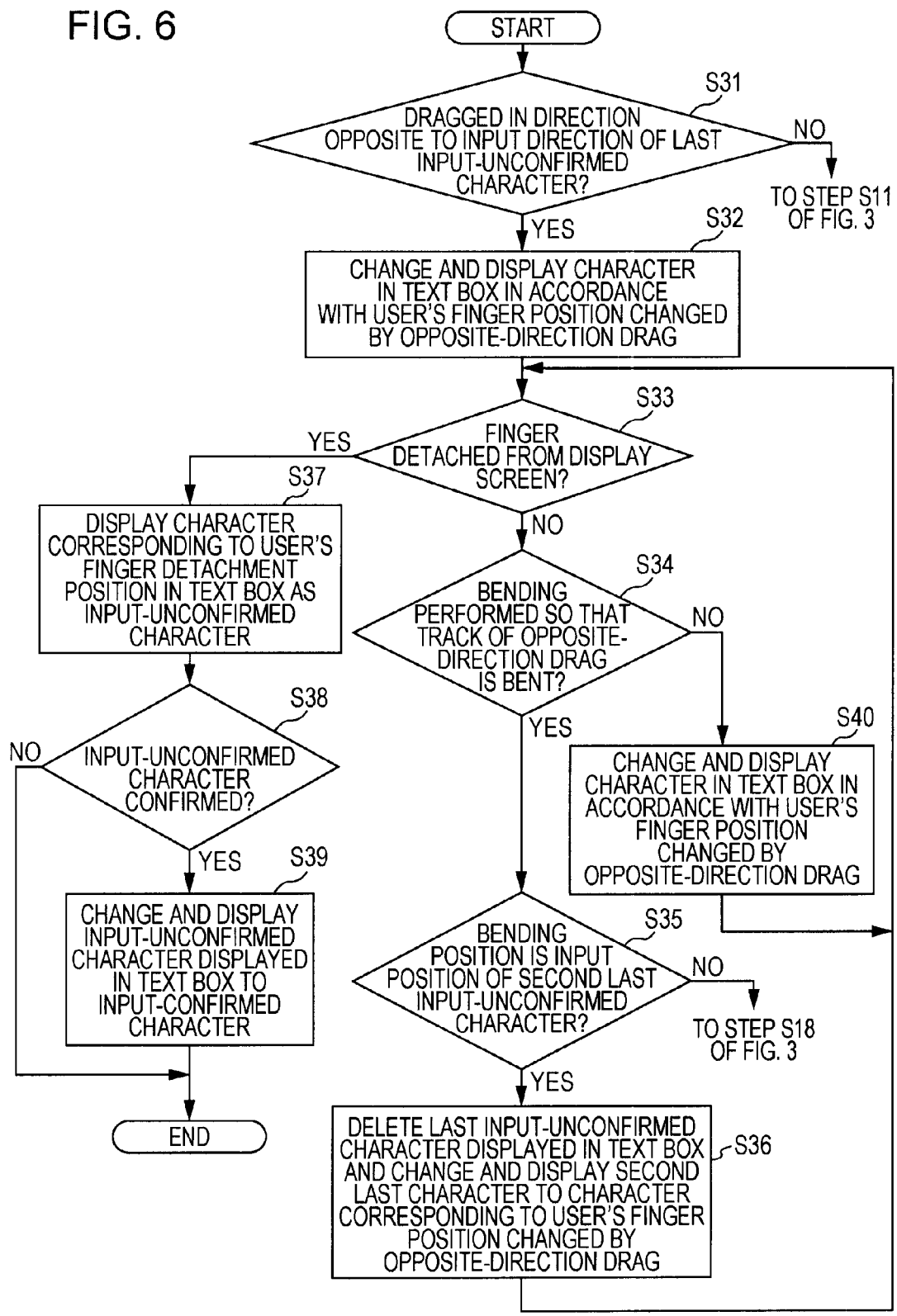
FIG. 6 is a flowchart showing replacement of an input-unconfirmed character in the cellular phone according to the embodiment.

The flowchart of FIG. 6 shows the flow of replacement of an input-unconfirmed character. When the control unit 15 displays an input-unconfirmed character in the text box 22, it starts the process shown in the flowchart of FIG. 6 in accordance with the character input program stored in the memory 14 of FIG. 1.

To replace an input-unconfirmed character in the cellular phone according to this embodiment, the user drags the finger in a direction opposite to the direction in which the finger has been dragged when inputting the input-unconfirmed character.

Thus, first, in step S31, the control unit 15 determines whether the finger has been dragged in a direction opposite to the direction of a drag performed at the time of input of the last one of input-unconfirmed characters currently displayed in the text box 22, by detecting the operation state of the input area 21.

When the control unit 15 does not detect such an opposite-direction drag, it returns the process to step S11 of the flowchart of FIG. 3 and performs a character input process corresponding to the above-mentioned drag performed by the user.

In contrast, when the control unit 15 detects such an opposite-direction drag, for example, as shown by the hollow arrow of FIG. 7, it advances the process to step S32. In step S32, the control unit 15 changes and displays the last input-unconfirmed character in the text box 22 in accordance with the position of the finger of the user changed by the opposite-direction drag and advances the process to step S33.

Specifically, the example shown in FIG. 7(a) is an example where the character "F" is inputted next to the characters "A" and "K" and where the characters "A," "K," and "F" are displayed in the text box 22 as input-unconfirmed characters. In this case, when the finger is dragged in a direction indicated by the hollow arrow of FIG. 7(a), which is a direction opposite to the direction of the drag performed at the time of input of the character "F" serving as the last input-unconfirmed character, the control unit 15 changes and displays the input-unconfirmed character "F" in the text box 22 in the order of "F," "E," "D," "C," and the like in accordance with the position of the finger of the user changed by this opposite-direction drag.

In specifying the input of the desired character, the user detaches the finger from the input area 21 or bends it as described above at the timing when the last input-unconfirmed character is changed to the desired character and displayed by the opposite-direction drag as described above.

The control unit 15 checks in step S33 whether the finger has been detached and checks in step S34 whether the finger has been bent.

When the control unit 15 detects in step S33 that the finger of the user has been detached from the input area 21, it advances the process to step S37. For example, as shown in FIG. 7(*b*), the control unit 15 displays a character displayed in the position in which the finger of the user has been detached from the input area 21, in the text box 22 as an input-unconfirmed character.

The example shown in FIG. 7(*b*) is an example where the opposite-direction drag has been performed from the display position of the character "F" to the display position of the character "C" and where the user has detached the finger from the input area 21 in the display position of the character "C." In this case, the control unit 15 recognizes that the input of the character "C" displayed in the position in which the user has detached the finger from the input area 21 has been specified. The control unit 15 then displays the character "C" in the display position in which the character "F" has been displayed thus far.

As described above, the control unit 15 changes the input-unconfirmed character to an input-confirmed character by the processes shown in steps S38 and S39.

In step S34, the control unit 15 checks whether the finger has been bent so that the track of the opposite-direction drag is bent. If it does not detect such a bending, the control unit 15 advances the process to step S40; if it does, the control unit 15 advances the process to step S35.

In step S40, due to non-detection of such a bending, the control unit 15 changes and displays the last input-unconfirmed character in the text box 22 in accordance with the position of the finger of the user changed by the opposite-direction drag. It then returns the process to step S33.

In contrast, when the control unit 15 advances the process to step S35 due to the detection of such a bending, it determines whether the position of the detected bending is the position in which the second input-unconfirmed character from the last input-unconfirmed character has been inputted.

Specifically, in the example of FIG. 7(*b*), the control unit 15 determines in step S35 whether the position in which the bending has been detected is the position in which the second input-unconfirmed character, "K," from the last input-unconfirmed character, "C," has been inputted.

The fact that the position in which the bending has been performed is not the position in which the second input-unconfirmed character from the last input-unconfirmed character has been inputted means that this bending is an operation for specifying the input of a character currently displayed in the text box 22.

For this reason, when the control unit 15 determines that the bending is not the position in which the second input-unconfirmed character from the last input-unconfirmed character has been inputted, it recognizes that the input of the character displayed in the position on the input area 21 in which the bending has been performed has been specified and advances the process to step S18 of the flowchart of FIG. 3. In step S18, the control unit 15 displays the character displayed in the position on the input area 21 in which the bending has been performed, in the text box 22 as an input-unconfirmed character. It then returns the process to step S11 and moves to the input mode of the next character.

In contrast, the fact that the position in which the bending has been performed is the position in which the second input-unconfirmed character from the last input-unconfirmed character has been inputted means that the last input-unconfirmed character is an unnecessary character and that the user is currently replacing the second input-unconfirmed character from the last input-unconfirmed character.

Thus, when the control unit 15 determines that the bending is a bending performed in the position in which the second input-unconfirmed character from the last input-unconfirmed character has been inputted, it advances the process to step S36. In step S36, the control unit 15 deletes the last input-unconfirmed character displayed in the text box 22, as well as changes and displays the second last character to a character corresponding to the position of the finger of the user changed by the opposite-direction drag. It then returns the process to step S33.

Specifically, in the example of FIG. 7(*a*), when the control unit 15 detects the bending in the position in which the second input-unconfirmed character, "K," from the last input-unconfirmed character, "F," has been inputted, it deletes the last input-unconfirmed character, "F," from the text box 22 as shown in FIG. 7(*c*). It then sequentially changes and displays the second last character, "K," displayed in the text box 22 in accordance with the position of the finger of the user changed by the opposite-direction drag, for example, in the order of "K," "J," "I," "H," "G," and the like.

In the cellular phone according to this embodiment, replacement of the input-unconfirmed character is performed as follows.

First, a drag is performed in a direction opposite to the direction of a drag which has inputted the last input-unconfirmed character. Thus, the control unit 15 changes and displays the last input-unconfirmed character in accordance with the opposite-direction drag. When the user performs the opposite-direction drag to the display position of a desired character, the user detaches the finger from the input area 21 or bends it so as to specify the input of the character.

When the control unit 15 detects that the finger of the user has been detached from the input area 21, it displays a character displayed in the position which the finger of the user has been detached, in the text box 22 as a new input-unconfirmed character instead of the last input-unconfirmed character.

Alternatively, when the control unit 15 detects a bending, it displays a character displayed in the position in which the bending has been performed, in the text box 22 as a new input-unconfirmed character instead of the last input-unconfirmed character.

As seen, the user can easily replace the inputted input-unconfirmed character with the desired input-unconfirmed character by performing the opposite-direction drag to the display position of the desired character and detaching the finger from the input area 21 or bending it.

[Input-Confirmed Character Deletion Process]

Traditionally, in deleting input-confirmed characters, the characters have been deleted one by one by moving the cursor to the display position of a character to be deleted and pressing a dedicated deletion key. Alternatively, traditionally, in deleting input-confirmed characters, the desired number of characters have been deleted by specifying the range of the characters to be deleted and specifying the execution of deletion.

These deletion methods, however, require bothersome operations such as movement of the cursor to the display positions of characters to be deleted, specification of the range of characters to be deleted, a press on the dedicated deletion key, and specification of the execution of detection.

For this reason, it is desirable to provide a character input device that can delete desired characters easily and quickly.

In the cellular phone according to this embodiment, when the enter key, which is a hardware key or software key, is operated by the user as described above, the control unit 15 deletes the underlines attached to the input-unconfirmed characters in the text box 22 and displays the input-unconfirmed characters as input-confirmed characters, as shown in FIG. 9(*a*). These input-confirmed characters can be deleted easily and quickly by performing deletion to be described below.

Figure 8:
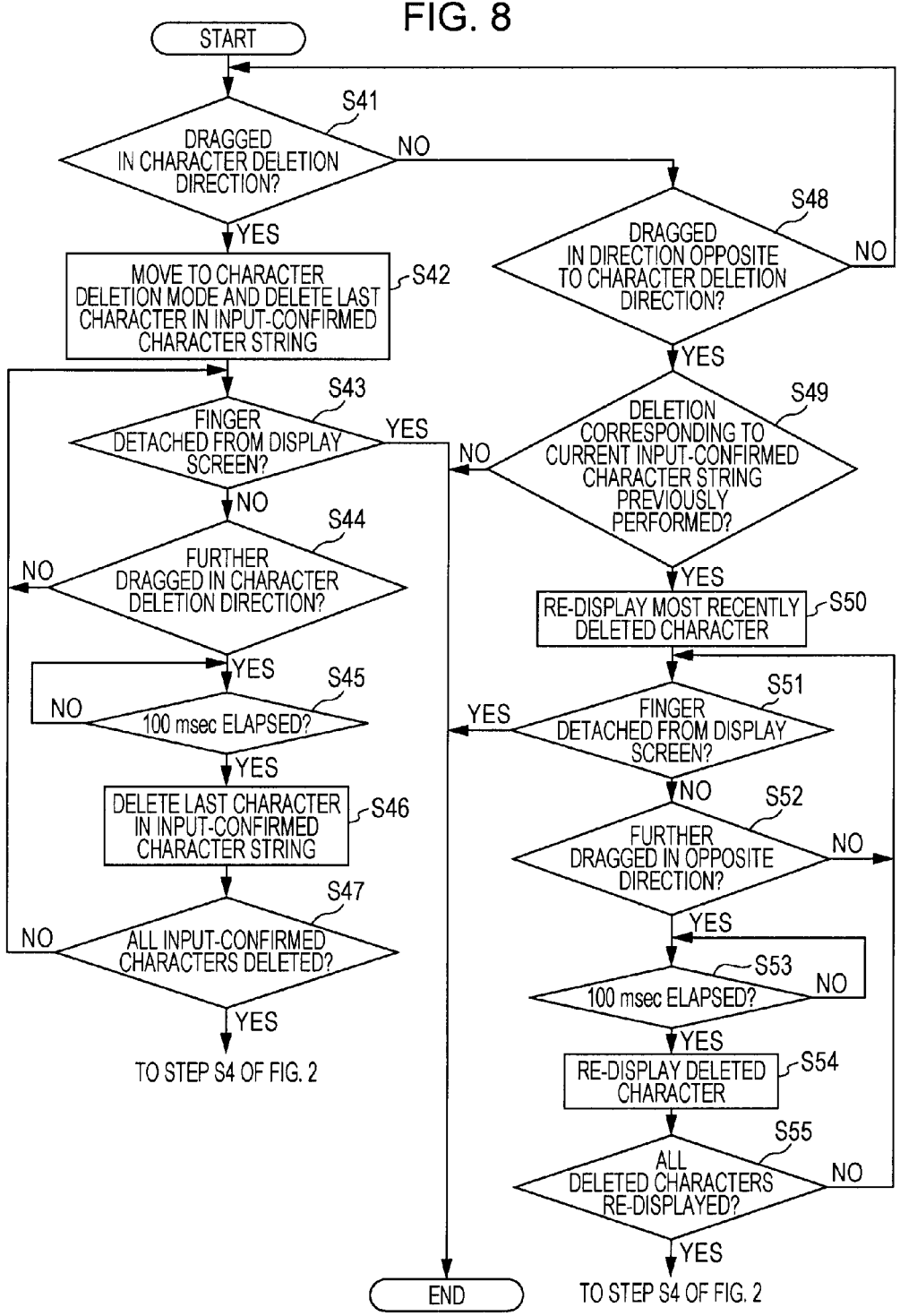
FIG. 8 is a flowchart showing the input-confirmed character deletion process in the cellular phone according to the embodiment.
Figure 9A:
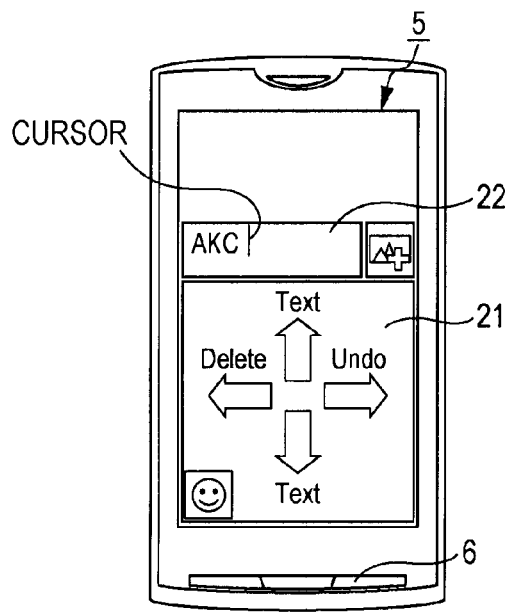
FIG. 9 includes drawings showing an aspect where input-confirmed characters are sequentially deleted by the input-confirmed character deletion process in the cellular phone according to the embodiment.
Figure 9B:
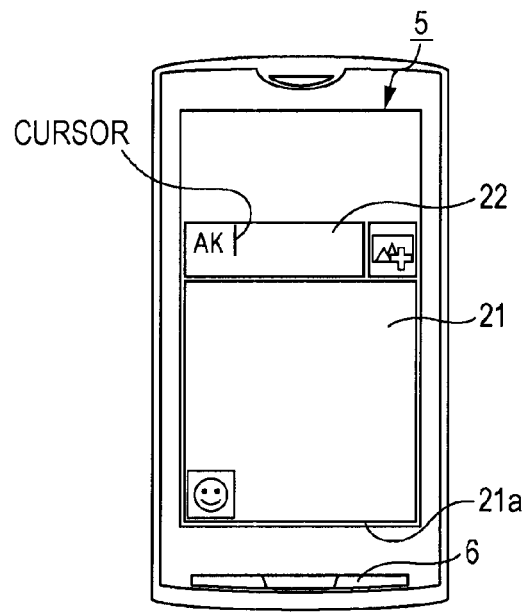
Figure 9C:
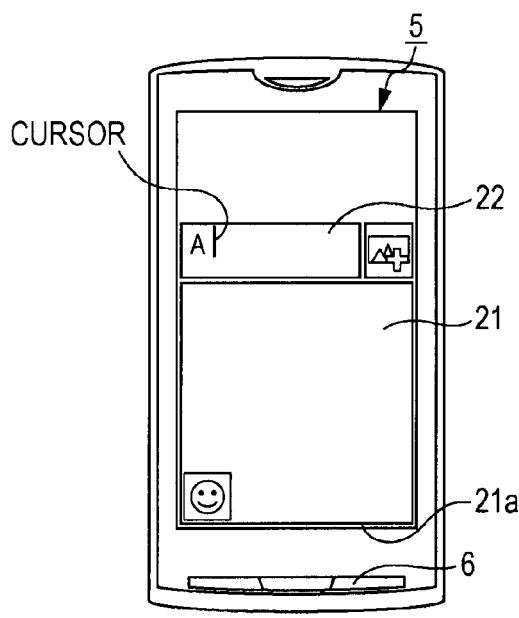
Figure 9D:
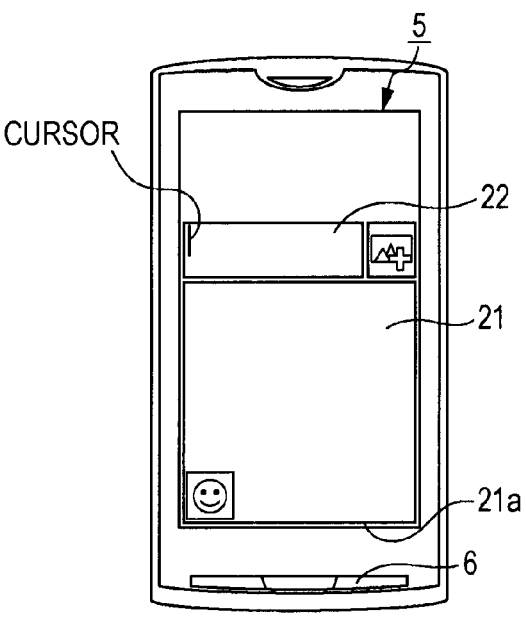
Figure 11A:
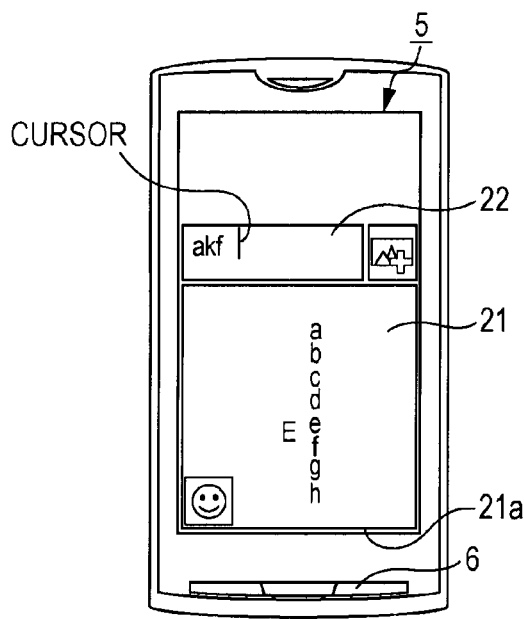
FIG. 11 includes drawings showing an example related character display in the cellular phone according to the embodiment.
Figure 11B:
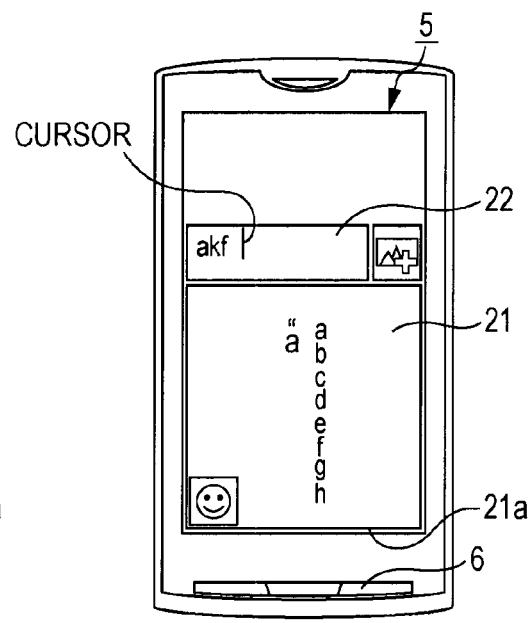
Figure 11C:
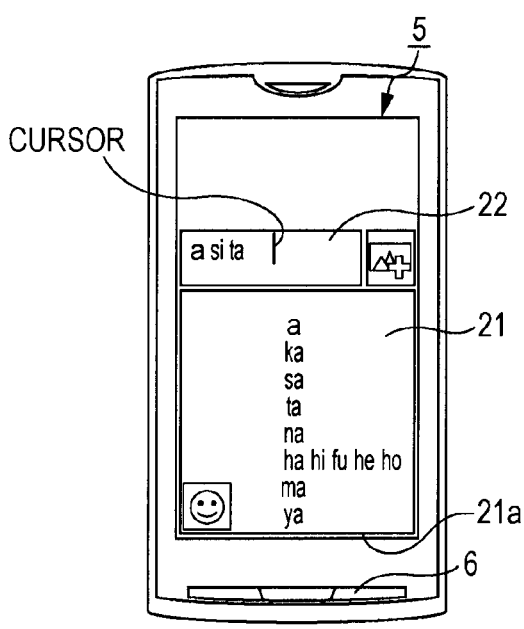
Figure 11D:
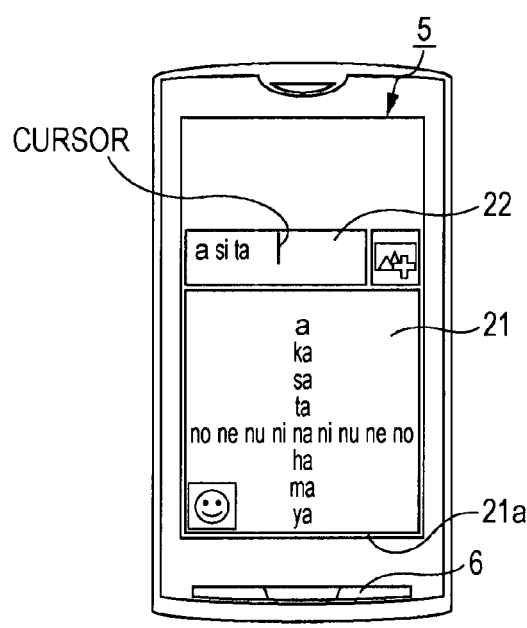

The flowchart of FIG. 8 shows the flow of the deletion of input-confirmed characters in the cellular phone according to this embodiment. When the control unit 15 displays input-confirmed characters in the text box 22, it starts the process shown in the flowchart of FIG. 8 in accordance with the character input program stored in the memory 14.

First, the control unit 15 determines in step S41 whether the user has performed a drag in a direction specifying the deletion of the input-confirmed characters, by checking the operation state of the input area 21. The control unit 15 then determines in step S48 whether a drag has been performed in a direction opposite to the direction specifying the deletion of an input-confirmed character.

Specifically, when only the input-confirmed characters are displayed in the text box 22 in the cellular phone according to this embodiment, a left drag serves as an operation for deleting an input-confirmed character and a right drag serves as an undo operation for sequentially tracing back and re-displaying previously deleted input-confirmed characters, as shown by leftward and rightward arrows in FIG. 9(*a*).

Thus, when only the input-confirmed characters are displayed in the text box 22, the control unit 15 determines in step S41 whether the user has performed a left drag to specify the deletion of the input-confirmed characters. The control unit 15 also determines in step S48 whether the user has performed a right drag to specify the re-display of previously deleted input-confirmed characters.

When the control unit 15 determines in step S41 that the user has performed a left drag to specify the deletion of the input-confirmed characters, it moves to input-confirmed character deletion mode. In step S42, for example, as shown in FIG. 9(*b*), the control unit 15 deletes the last input-unconfirmed character, "C," of the input-confirmed characters "A," "K," and "C" currently displayed in the text box 22 shown in FIG. 9(*a*) from the text box 22 and advances the process to step S43.

When the control unit 15 deletes this input-confirmed character, it stores the deleted character in the memory 14 or the like. When the re-display process (undo process) to be described later is specified, the control unit 15 reads the stored character from the memory 14 and re-displays it in the text box 22.

In step S43, the control unit 15 checks the operation state of the input area 21 to determine whether the finger of the user has been detached from the input area 21. When the control unit 15 determines that the finger of the user has been detached from the input area 21, it recognizes that the completion of the deletion of the desired input-confirmed character has been specified. It then completes the input-confirmed character deletion process shown in the flowchart of FIG. 8.

In contrast, when the control unit 15 determines in step S43 that the finger of the user has not been detached from the input area 21, it advances the process to step S44. The control unit 15 checks the operation state of the input area 21 to determine whether an additional drag has been performed in the direction specifying the deletion of a character, the left direction.

When the control unit 15 determines that an additional drag has been performed in the left direction, it waits in step S45 until a predetermined time, for example, 100 msec elapses. At the timing when the predetermined time has elapsed, in step S46, for example, as shown in FIG. 9(*c*), the control unit 15 additionally deletes the last input-confirmed character, "K," of the input-confirmed characters "A" and "K" currently displayed in the text box 22 shown in FIG. 9(*b*). It then advances the process to step S47. As described above, the input-confirmed character deleted from the text box 22 is stored in the memory 14 or the like for the undo process to be described later.

In step S47, the control unit 15 determines whether all the input-confirmed characters displayed in the text box 22 have been deleted as shown in FIG. 9(*d*). When the control unit 15 determines that there remains an input-confirmed character in the text box 22, it returns the process to step S43 and repeatedly performs the above-mentioned processes. Thus, the input-confirmed characters in the text box 22 are sequentially deleted each time the above-mentioned 100 msec elapses, starting with the last input-confirmed character.

When the control unit 15 determines that all the input-confirmed characters have been deleted, it completes the deletion process shown in the flowchart of FIG. 8. It then advances the process to step S4 of the flowchart of FIG. 2 and waits the user to input desired characters.

In this example, the input-confirmed characters in the text box 22 are deleted each time the predetermined time, e.g., 100 msec elapses. Alternatively, the input-confirmed characters in the text box 22 may be deleted in accordance with the drag length in the direction specifying the deletion of an input-confirmed character (left direction), the operation pixel count corresponding to a drag in the direction specifying the deletion of an input-confirmed character, the time during which the finger is placed on the input area 21, or the like.

In deleting the input-confirmed characters in the text box 22 in accordance with the drag length in the direction specifying the deletion of an input-confirmed character, the control unit 15 determines in the above-mentioned step S45 whether a drag with a predetermined length of, e.g., 5 mm has been performed in the direction specifying the detection of an input-confirmed character. In step S45, the control unit 15 sequentially deletes the input-confirmed characters in the text box 22 each time it detects a drag with the predetermined length (each time the user performs a drag with the above-mentioned 5 mm), starting with the last input-confirmed character.

In deleting the input-confirmed characters in the text box 22 in accordance with the pixel count of a drag in the direction specifying the deletion of an input-confirmed character, the control unit 15 determines in the above-mentioned step S45 whether the pixel count corresponding to a drag in the direction specifying the deletion of an input-confirmed character has reached a predetermined pixel count. In step S45, the control unit 15 sequentially deletes the input-confirmed characters in the text box 22 each time it detects a drag corresponding to the predetermined pixel count, starting the last input-confirmed character.

In deleting the input-confirmed characters in the text box 22 in accordance with the time during which the finger of the user is placed on the input area 21 after a drag is performed in the direction specifying the deletion of an input-confirmed character, the control unit 15 determines in the above-mentioned step S45 whether a predetermined time of, e.g., 100 msec has elapsed since the placement of the finger of the user on the input area 21. In step S45, the control unit 15 sequentially deletes the input-confirmed characters in the text box 22 each time it detects a lapse of the predetermined time, starting the last input-confirmed character.

When the control unit 15 determines in the above-mentioned step S48 that the user has performed a right drag to specify re-display of previously deleted input-confirmed characters, it moves to undo mode. In step S49, the control unit 15 refers to deleted input-confirmed characters stored in the memory 14 to determine whether a deletion process corresponding to the input-confirmed character string currently displayed in the text box 22 has been performed previously.

If a deletion process corresponding to the input-confirmed character string currently displayed in the text box 22 has not been performed previously, the control unit 15 can recognize that no previously deleted input-confirmed characters are stored in the memory 14. The fact that no previously deleted input-confirmed characters are stored in the memory 14 means that there are no input-confirmed characters to be re-displayed. Accordingly, the control unit 15 immediately completes the deletion process shown in the flowchart of FIG. 8.

In contrast, when the control unit 15 determines that a deletion process corresponding to the input-confirmed character string currently displayed in the text box 22 has been performed previously by referring to the input-confirmed characters stored in the memory 14, it re-displays the most recently deleted input-confirmed character in the text box 22 and advances the process to step S51.

Specifically, as has been described with reference to FIGS. 9A and 9B, if the input-confirmed character "C" of the input-confirmed characters "A," "K," and "C" has been deleted previously, the control unit 15 reads the input-confirmed character "C" stored in the memory 14 and re-displays it in the text box 22, as shown in FIG. 9(*a*).

After the re-display, the control unit 15 advances the process to step S51 to check the operation state of the input area 21. Thus, it determines whether the finger of the user has been detached from the input area 21. When the control unit 15 determines that the finger of the user has been detached from the input area 21, it recognizes that the user has specified the completion of the re-display of the deleted input-confirmed character. The control unit 15 then completes the process shown in the flowchart of FIG. 8.

In contrast, when the control unit 15 determines in step S51 that the finger of the user has not been detached the input area 21, it advances the process to step S52 to check the operation state of the input area 21. Thus, the control unit 15 determines whether an additional drag has been performed in the direction specifying the re-display of a previously deleted input-confirmed character, the right direction.

When the control unit 15 determines that an additional drag has been performed in the right direction, it waits in step S53 until a predetermined time of, e.g., 100 msec, elapses. At the timing when the predetermined time has elapsed, in step S54, the control unit 15 re-displays the second most recently deleted input-confirmed character in the text box 22 and advances the process to step S55.

In step S55, the control unit 15 refers to the previously deleted input-confirmed characters stored in the memory 14 to determine whether all the previously deleted input-confirmed characters have been re-displayed in the text box 22.

When the control unit 15 determines that not all the previously deleted input-confirmed characters are re-displayed in the text box 22, it returns the process to step S51 and repeatedly performs the above-mentioned processes. Thus, the previously deleted input-confirmed characters are sequentially re-displayed in the text box 22 each time the above-mentioned 100 msec elapses.

When the control unit 15 determines that all the previously deleted input-confirmed characters have been re-displayed in the text box 22, it completes the deletion process shown in the flowchart of FIG. 8. It then advances the process to step S4 of the flowchart of FIG. 2 and waits the user to input desired characters.

In this example, the previously deleted input-confirmed characters are re-displayed in the text box 22 each time the predetermined time, for example, 100 msec elapses. Alternatively, the previously deleted input-confirmed characters may be re-displayed in accordance with the drag length in the direction specifying the re-display of a previously deleted input-confirmed character (right direction), the operation pixel count corresponding to a drag in the direction specifying the re-display of a previously deleted input-confirmed character, the time during which the finger is placed on the input area 21, or the like.

In re-displaying an input-confirmed character in accordance with the drag length in the direction specifying the re-display of a previously deleted input-confirmed character, the control unit 15 determines in the above-mentioned step S53 whether a drag with a predetermined length of, e.g., 5 mm has been performed in the direction specifying the re-display of a previously deleted input-confirmed character. In step S53, the control unit 15 sequentially re-displays the previously deleted input-confirmed characters in the text box 22 in the order of deletion each time it detects a drag with the predetermined length (each time the user performs a drag with the above-mentioned 5 mm).

In re-displaying an input-confirmed character in the text box 22 in accordance with a pixel count corresponding to a drag in the direction specifying the re-display of a previously deleted input-confirmed character, the control unit 15 determines in the above-mentioned step S53 whether the pixel count corresponding to the drag in the direction specifying the re-display of a previously deleted input-confirmed character has reached a predetermined pixel count. In step S53, the control unit 15 re-displays the previously deleted input-confirmed characters in the text box 22 in the order of deletion each time it detects a drag corresponding to the predetermined pixel count.

In re-displaying previously deleted input-confirmed characters in accordance with, for example, the time during which the finger is placed on the input area 21, the control unit 15 determines in the above-mentioned step S53 whether a predetermined time of, e.g., 100 msec has elapsed since the placement of the finger of the user on the input area 21. In step S53, the control unit 15 re-displays previously deleted input-confirmed characters in the text box 22 in the order of deletion each time it detects a lapse of this predetermined time.

As seen, when the user simply performs, for example, a left drag in the input area 21, the cellular phone according to this embodiment sequentially deletes input-confirmed characters in the text box 22 in accordance with the drag time, drag length, or the like. Thus, the user can delete desired characters quickly by an easy operation such as a left drag.

Further, when the user simply performs, for example, a right drag in the input area 21, the cellular phone according to this embodiment sequentially re-displays previously deleted input-confirmed characters in the text box 22 in accordance with the drag time or drag length. Thus, the user can re-display desired characters quickly by an easy operation such as a right drag.

[Related Character Display Process]

In the middle of inputting characters, users often vacillate over which character should be inputted next. In such a case, most of users consider a character to be inputted next while stopping the finger which is touching the input area 21.

In view of the foregoing, when the finger of the user is stopped in the input area 21 for a predetermined time or more in the middle of inputting characters, the cellular phone according to this embodiment assists the user in inputting characters by displaying characters, signs, or the like related to a character displayed in the position in which the finger of the user is stopped.

Steps S61 to 64 of the flowchart of FIG. 10 show the flow of this related character display process. In the flowchart of FIG. 10, the same step numbers are assigned to the same steps as those in the flowchart of FIG. 2. For the processes in the same step numbers, see the description of the processes in the flowchart of FIG. 2.

Specifically, in inputting characters, the control unit 15 checks the operation state of the input area 21 in step S61 of the flowchart of FIG. 10 to determine whether the finger has been stopped in the same position on the input area 21, e.g., for 500 msec or more. Thus, it determines whether the drag has been stopped.

When the control unit 15 determines that the drag has been stopped, it advances the process to step S62. The control unit 15 refers to the word dictionary or the like stored in the memory 14 to detect characters, signs, or the like related to the character displayed in the position in which the finger of the user is currently stopped. It then advances the process to step S63.

In step S63, based on the detection result in the above-mentioned step S62, the control unit 15 determines whether there are characters, signs, or the like related to the character displayed in the position in which the finger of the user is currently stopped. If it determines that there are such characters or the like, the control unit 15 displays the detected related character or the like in the input area 21 during the stop of the drag in step S64.

Some examples will be described. First, the example shown in FIG. 11(*a*) is an example where an uppercase character is displayed as a related character. As shown in FIG. 11(*a*), when the finger of the user is stopped in the display position of the character "e" with lowercase alphabet characters displayed in a line in the input area 21 as candidate characters for input, the control unit 15 displays an uppercase of the character "e," the character "E," in the input area 21.

As described above, the user drags the finger to the display position of the uppercase character "E" and specifies the input of the uppercase character "E" by detaching the finger from the input area 21 or bending the finger that has been dragged to the display position of the uppercase character "E." When one of the above-mentioned operations is performed, the control unit 15 displays the uppercase character "E" in the text box 22 as an input-unconfirmed character.

The example shown in FIG. 11(*b*) is an example where a character having thereon an umlaut mark (a mark which is attached to the upper part of a vowel of the Latin alphabet and where two points are arranged side by side) is displayed. As shown in FIG. 11(*b*), when the finger of the user is stopped in the display position of the character "a" with lowercase alphabet characters displayed in a line in the input area 21 as candidate characters for input, the control unit 15 displays a character where an umlaut mark is attached to the character "a," in the input area 21.

As described above, the user specifies the input of the character having the umlaut mark attached thereto by dragging the finger to the display position of the character having the umlaut mark attached thereto and then detaching the finger from the input area 21 or by bending the finger dragged to the display position of the character having the umlaut mark attached thereto. When one of the above-mentioned operations is performed, the control unit 15 displays the character having the umlaut mark attached thereto in the text box 22 as an input-unconfirmed character.

The example shown in FIG. 11(*c*) is an example where, in inputting hiragana characters, a list of characters in a selected row is displayed. As shown in FIG. 11(*c*), when the finger of the user is stopped in the display position of the row "ha" with characters in the rows a, ka, sa, ta, na, ha, and the like displayed in a line in the input area 21 as candidate characters for input, the control unit 15 displays a list of characters in the row "ha," the characters "hi," "fu," "he," and "ho," in the input area 21.

As described above, the user specifies the input of the desired one of the characters in the row "ha" by dragging the finger to the display position of the desired one of the characters in the row "ha" and then detaching the finger from the input area 21 or by bending the finger dragged to the display position of the desired one of the characters in the row "ha." When one of the above-mentioned operations is performed, the control unit 15 displays the input-specified one of the characters in the row "ha" in the text box 22 as an input-unconfirmed character.

The example shown in FIG. 11(*d*) is an example where, in inputting hiragana characters, a list of characters in a selected row is displayed on both sides. As shown in FIG. 11(*d*), when the finger of the user is stopped in the display position of the row "na" with characters in the rows a, ka, sa, ta, na, ha, and the like displayed in a line in the input area 21 as candidate characters for input, the control unit 15 displays a list of characters in the row "na," the characters "ni," "nu," "ne," and "no," on the right side of the character in the row "na." Further, the control unit 15 displays a list of characters in the row "na," the characters "no," "ne," "nu," and "ni," on the left side of the character in the row "na."

As described above, in selecting the desired one of the characters in the row "na," the user drags the finger to the display position of the desired one of the characters in the row "na" displayed on both sides and then detaches the finger from the input area 21 or bends the dragged finger so as to specify the input of the desired one of the characters in the row "na." When one of the above-mentioned operations is performed, the control unit 15 displays the input-specified one of the characters in the row "na" in the text box 22 as an input-unconfirmed character.

In the example shown in FIG. 11(*d*), related characters are displayed in a line on both sides of the character on which the finger of the user has been stopped. Thus, it is possible to select a character on any of the left and right sides which can be inputted more easily and then specify the input of the character. As a result, characters can be inputted more easily and more quickly.

[Character Touch Area Enlargement Process]

In general, the touch areas of characters displayed to input characters by touches are equal in size.

However, to display the touch areas of many characters in the limited display area, it is necessary to reduce the touch area of each character to display the touch areas of many characters. Disadvantageously, as the touch area of each character is made smaller, it becomes more difficult to input characters.

While the input of each character can be made easy by enlarging the touch area of each character, the enlargement of the touch area of each character limits the number of touch areas displayable in the limited display area. Disadvantageously, this results in the display of only the touch areas of a few characters, preventing quick input of characters.

For this reason, it is necessary to provide a character input device that can display the touch areas of many characters in the limited display area, as well as can enlarge the touch area as much as possible to make it easy to input characters.

In view of the foregoing, the cellular phone according to this embodiment enlarges only the touch area of a character corresponding to the position of the finger dragged by the user. Thus, the cellular phone enlarges only the touch area of a character to be inputted while displaying the touch areas of many characters in the limited display area. This makes it easy to input characters.

Among conceivable methods for enlarging only the touch area of a character to be inputted are the following two methods.

1. A method of making the touch area of a character to be inputted larger than those of the other characters without changing the size of the display area of each character and then detecting the input of this character so as to facilitate the input of this character 2. A method of making the display area and the touch area of a character to be inputted larger than the display areas and the touch areas of the other characters so as to facilitate the input of this character The touch area may be enlarged using any of these methods. Hereafter, the control operation of the control unit 15 in enlarging the touch area using the above-mentioned method "1" will be described.

Figure 12:
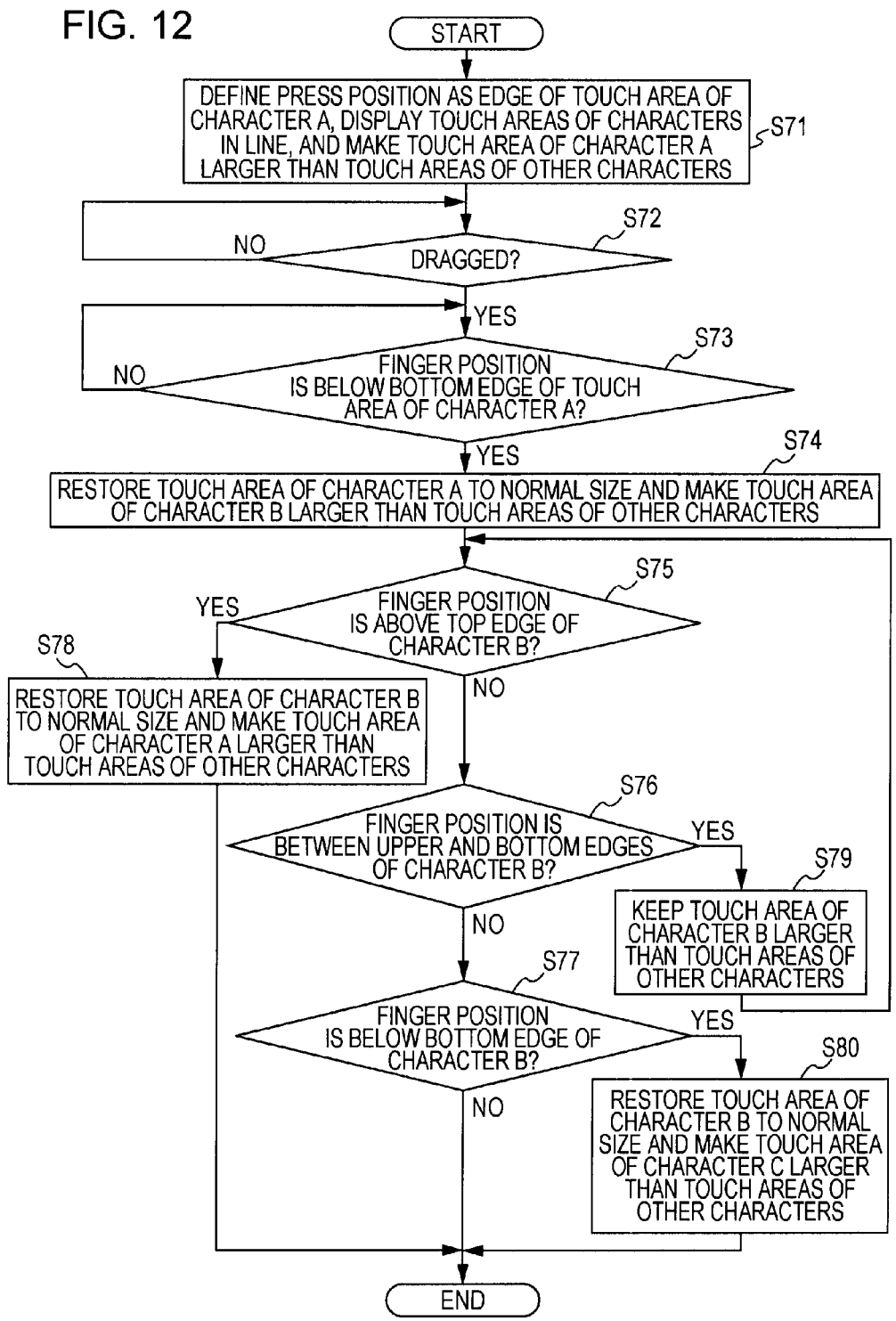
FIG. 12 is a flowchart showing the process of enlarging the touch area of a character corresponding to a drag position in the cellular phone according to the embodiment.

The flowchart of FIG. 12 shows the flow of the touch area enlargement process in the cellular phone according to this embodiment. When the control unit 15 detects a press on any position of the input area 21, it starts the process shown in the flowchart of FIG. 12 in accordance with the character input program stored in the memory 14.

Figure 13A:
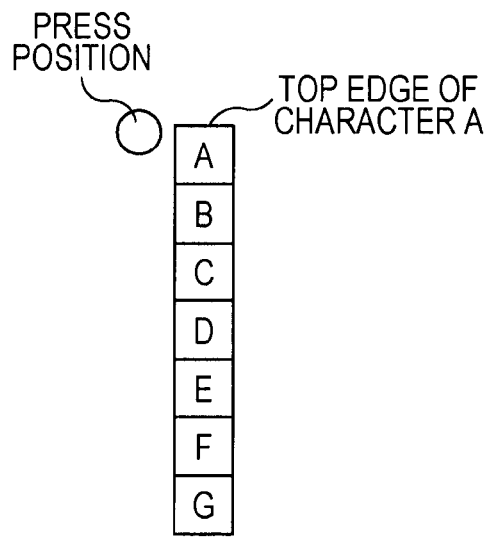
FIG. 13 includes schematic diagrams showing an example of the process of enlarging the touch area of a character corresponding to a drag position in the cellular phone according to the embodiment.
Figure 13B:
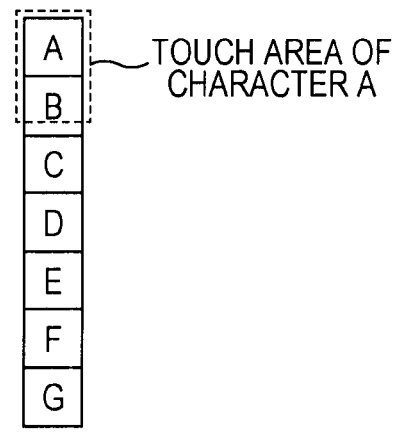

For example, in displaying candidate alphabet characters for input, the control unit 15 defines the press position of the user as an edge of the touch area of the character "A" as shown in FIG. 13(a) and sequentially displays characters in a line, as well as makes the touch area of the character "A" larger than the touch areas of the other characters, as shown by the dotted frame in FIG. 13(b). It then advances the process to step S72.

That is, the control unit 15 sequentially displays the characters in a line from the position pressed by the finger of the user, starting with the character "A," and enlarges only the touch area of the first character, the character "A," immediately after displaying the characters.

For example, in enlarging the touch area, the control unit 15 enlarges the touch area so that its size becomes 1.8 times (or 1.9 times) larger than the original size.

Note that even when the touch area is enlarged, the display area of the character "A" has the same size as those of the other characters. That is, the control unit 15 enlarges only the internal touch area without changing the apparent size. Hereafter, such an enlargement process will be referred to as a "touch area internal (software-wise) enlargement process."

In step S72, the control unit 15 checks whether the finger has been dragged and advances the process to step S73 at the timing when it detects that the user has dragged the finger.

Figure 13C:
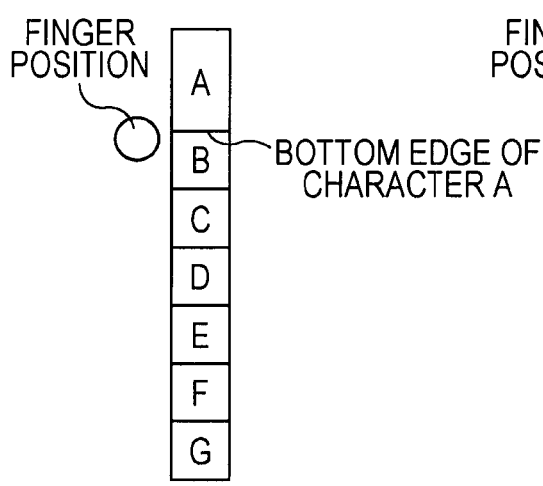

In step S73, the control unit 15 determines whether the position of the finger dragged by the user is located below the bottom edge of the enlarged touch area of the character "A," as shown in FIG. 13(c).

While, in FIG. 13(c), the display area of the character "A" is shown so that it is larger than those of the other characters, the size of the display area of the character "A" of FIG. 13(c) represents the size of the enlarged touch area of the character "A." It should be understood that the display area of the character "A" is actually displayed in the same size as those of the other characters, as described above, and that the only the touch area undergoes the above-mentioned internal enlargement process. The same goes for FIG. 13(d) and FIGS. 14A to 14F.

Figure 13D:
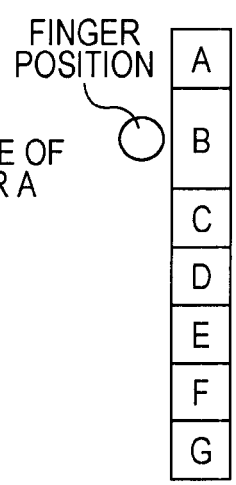

When the control unit 15 determines that the position of the finger dragged by the user is located below the bottom edge of the enlarged touch area of the character "A," it advances the process to step S74. The control unit 15 restores the size of the touch area of the character "A" to the normal size, as well as makes the touch area of the character "B" displayed below the character "A" larger than the touch areas of the other characters, as shown in FIG. 13(d). It then advances the process to step S75.

Specifically, in step S74, when the position of the finger of the user is moved below the bottom edge of the enlarged touch area of the character "A" owing to the drag, the control unit 15 restores the size of the touch area of the character "A" to the original size. It then enlarges the touch area of the character "B," on which the finger of the user is located.

Subsequently, the control unit 15 checks the drag of the finger of the user in accordance with the operation state of the input area 21. Thus, it determines whether the position of the finger of the user is located above the top edge of the touch area of the character "B" (step S75), whether the position of the finger of the user is located between the top and bottom edges of the touch area of the character "B" (step S76), and whether the position of the finger of the user is located below the bottom edge of the touch area of the character "B" (step S77).

When the control unit 15 determines in step S75 that the position of the finger of the user is located above the top edge of the touch area of the character "B," as shown in FIG. 14(a), it advances the process to step S78. As shown in FIG. 14(b), it restores the touch area of the character "B" to the normal size, as well as makes the touch area of the character "A" larger than the touch areas of the other characters.

When the control unit 15 determines in step S76 that the position of the finger of the user is located between the top and bottom edges of the touch area of the character "B," as shown in FIG. 14(c), it advances the process to step S79. As shown in FIG. 14(d), it keeps the touch area of the character "B" larger than the touch areas of the other characters.

When the control unit 15 determines in step S77 that the position of the finger of the user is located below the bottom edge of the touch area of the character "B," as shown in FIG. 14(e), it advances the process to step S80. It restores the touch area of the character "B" to the normal size, as shown in FIG. 14(f), as well as makes the touch area of the character "C" displayed below the character "B" larger than the touch areas of the other characters.

As seen, the control unit 15 enlarges the only touch area of a character corresponding to the position of the finger dragged by the user. Thus, it is possible to display the touch areas of many characters in the input area 21 of limited size and enlarge only the touch area of a character to be inputted. This facilitates the input of characters.

In the above description of the touch area enlargement process, the control unit 15 enlarges the touch area for detecting the input of the target character, without changing the size of the display area of each character.

That is, the control unit 15 enlarges only the touch area of the target character while leaving intact the size of the display area of each character seen from the user.

Alternatively, both the display area and the touch area of the target character may be enlarged. Thus, the apparent size of the display area of the target character and the size of the touch area thereof are matched, making it easy for the user to recognize the touch area.

[Icon Touch Area Enlargement Process]

In general, the touch areas of multiple icons displayed in the operation menu or the like are equal in size.

To display more icons in the limited display area, it is necessary to reduce the touch area of each icon to display the touch areas of many icons. Disadvantageously, as the touch area of each icon is made smaller, it becomes more difficult to operate the icons.

While the enlargement of the touch area of each icon facilitates a touch on each icon, the enlargement of the touch area of each icon limits the number of touch areas displayable in the limited display area. Disadvantageously, this results in the display of only a few icons, hampering a quick operation.

For this reason, it is necessary to provide an input device that can display many icons in the limited display area, as well as can enlarge the touch area as much as possible to facilitate a touch on each icon.

In view of the foregoing, the cellular phone according to this embodiment enlarges only the touch area of an icon corresponding the position of the finger dragged by the user. Thus, the cellular phone displays many icons in the limited display area and enlarges only the touch area of an icon which will be most probably operated by the user. This facilitates a touch on each icon.

Among conceivable methods for enlarging only the touch area of an icon which will be most probably operated by the user are the following two methods.

1. A method of making the touch area of an icon which will be most probably operated by the user larger than those of the other icons without changing the size of the display area of each icon so as to facilitate an operation of the icon which will be most probably operated by the user 2. A method of making the display area and the touch area of an icon which will be most probably operated by the user larger than the display areas and the touch areas of the other icons so as to facilitate the input of the icon which will be most probably operated by the user The touch area may be enlarged using any of these methods. Hereafter, the control operation of the control unit 15 in enlarging the touch area of an icon using the above-mentioned method "1" will be described.

Figure 15:
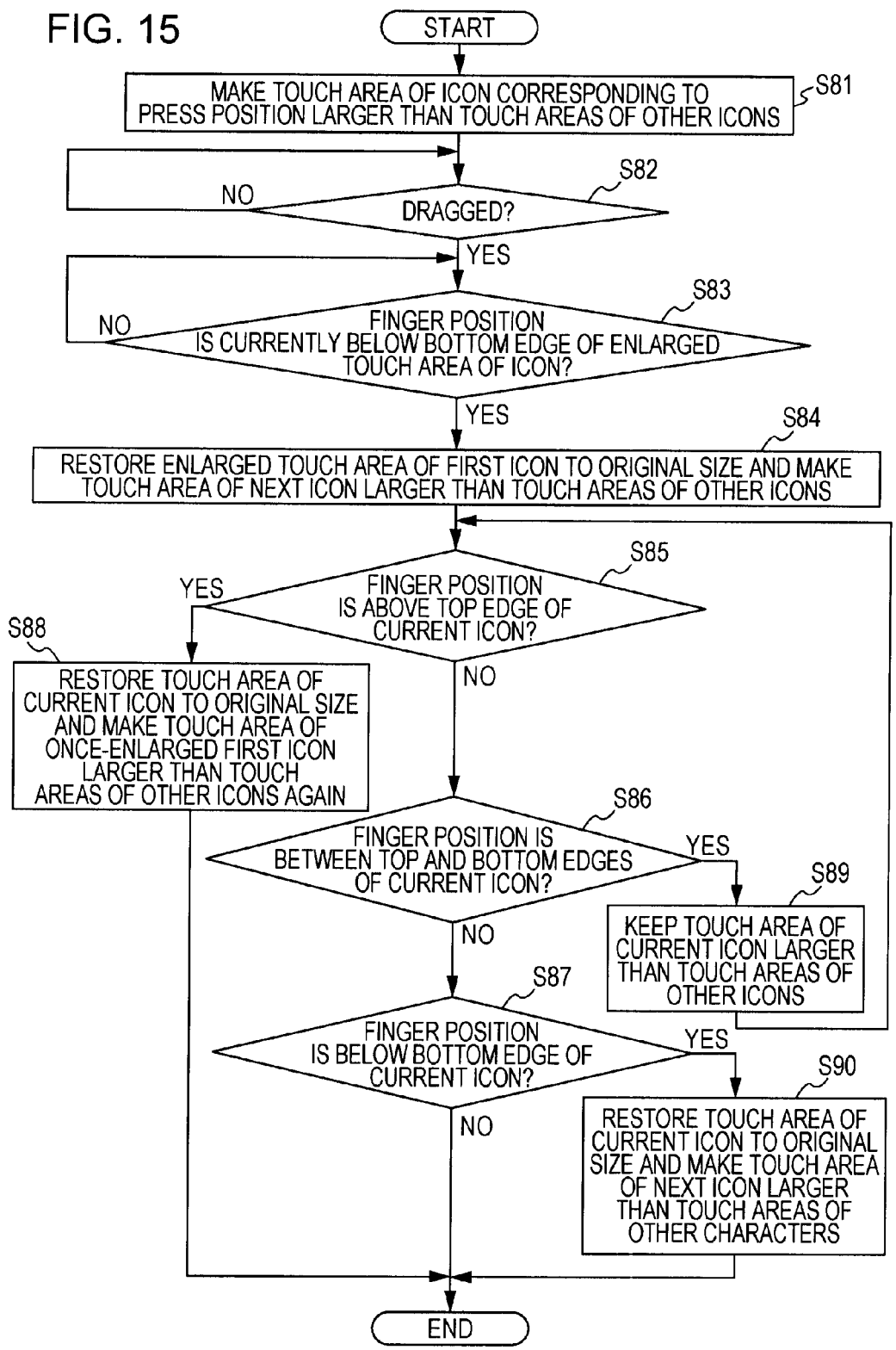
FIG. 15 is a schematic diagram showing another example of the process of enlarging the touch area of an icon corresponding to a drag position in the cellular phone according to the embodiment.

The flowchart of FIG. 15 shows the flow of the icon touch area enlargement process in the cellular phone according to this embodiment. When the control unit 15 displays icons of application programs, the total menu, and the like on the display unit 5, it starts the process shown in the flowchart of FIG. 15 in accordance with the character input program stored in the memory 14.

In step S81, the control unit 15 makes the touch area of an icon corresponding to the position on the display unit 5 pressed by the user larger than the touch areas of the other icons and advances the process to step S82.

Specifically, in step S81, when the position pressed by the user is a position corresponding to an icon of the camera application program (camera), as shown in FIG. 16(*a*), the control unit 15, enlarges only the touch area of the icon without changing the size of the display area of the icon so that the size of touch area becomes, for example, 1.8 times (or 1.9 times) larger than the original size, as shown by the dotted frame in FIG. 16(*a*).

As seen, even when the touch area is enlarged, the display area of the icon of the camera application program has the same size as those of the other icons. Accordingly, only the internal touch area is enlarged without changing the apparent size. Hereafter, such an enlargement process will be referred to as a "touch area internal (software-wise) enlargement process."

In step S82, the control unit 15 checks whether the finger has been dragged and advances the process to step S83 at the timing when it detects that the user has dragged the finger.

In step S83, the control unit 15 determines whether the position of the finger dragged by the user is located below the bottom edge of the enlarged touch area of the icon of the cameral application program, as shown in FIG. 16(*b*).

While the display area of the icon of the camera application program is shown in FIG. 16(*b*) so that it is larger than those of the other icons, the size of the icon of the camera application program shown in FIG. 16(*b*) represents the size of the enlarged touch area of that icon. It should be understood that the display area of the icon of the camera application program is actually displayed in the same size as those of the other icons, as described above, and that only the touch area undergoes the above-mentioned internal enlargement process. The same goes for FIGS. 16C and 16D and FIGS. 17A to 17D.

When the control unit 15 determines that the position of the finger dragged by the user is located below the bottom edge of the enlarged touch area of the icon of the camera application program, it advances the process to step S84. As shown in FIG. 16(*c*), the control unit 15 restores the touch area of the icon of the camera application, which is the first enlarged icon in this example, to the normal size, as well as makes the touch area of an icon next to the icon of the camera application program, an icon of a connection setup, larger than the touch areas of the other icons. It then advances the process to step S85.

Specifically, in step S84, when the position of the finger of the user is moved below the bottom edge of the enlarged touch area of the icon of the camera application program owing to the drag, the control unit 15 restores the size of the touch area of the icon to the original size and then enlarges the touch area of the icon of the connection setup, on which the finger of the user is located.

Subsequently, the control unit 15 checks the drag of the finger of the user in accordance with the operation state of the display unit 5. Thus, it determines whether the position of the finger of the user is located above the top edge of the touch area of the connection setup (step S85), whether the position of the finger of the user is located between the top and bottom edges of the touch area of the connection setup (step S86), and whether the position of the finger of the user is located below the bottom edge of the touch area of the connection setup (step S87).

Figure 16A:
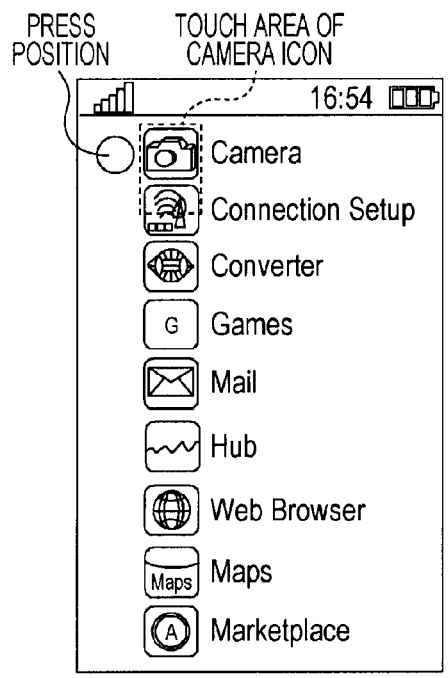
FIG. 16 includes schematic diagrams showing an example of the process of enlarging the touch area of an icon corresponding to a drag position in the cellular phone according to the embodiment.
Figure 16B:
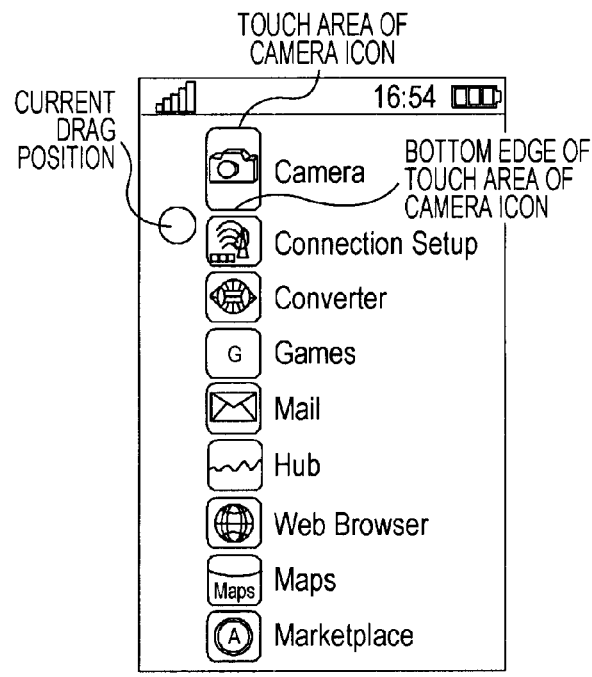
Figure 16C:
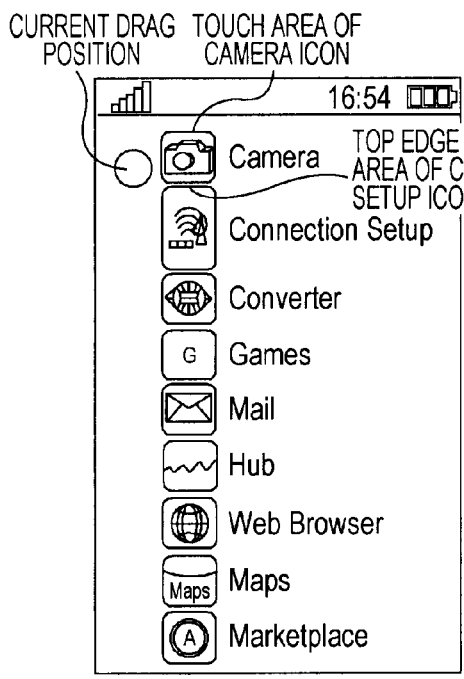
Figure 16D:
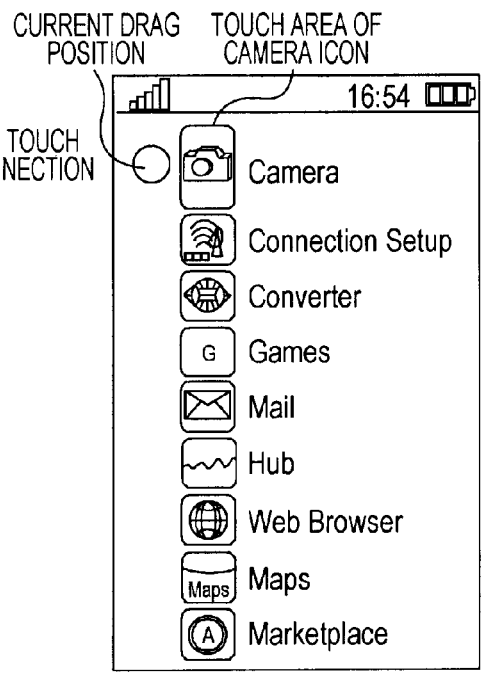

When the control unit 15 determines in step S85 that the position of the finger of the user is located above the top edge of the touch area of the icon of the connection setup, as shown in FIG. 15C, it advances the process to step S88. It then restores the touch area of the icon of the connection setup to the normal size, as shown in FIG. 16(d), as well as makes the touch area of the icon of the camera application program larger than those of the other icons.

Figure 17A:
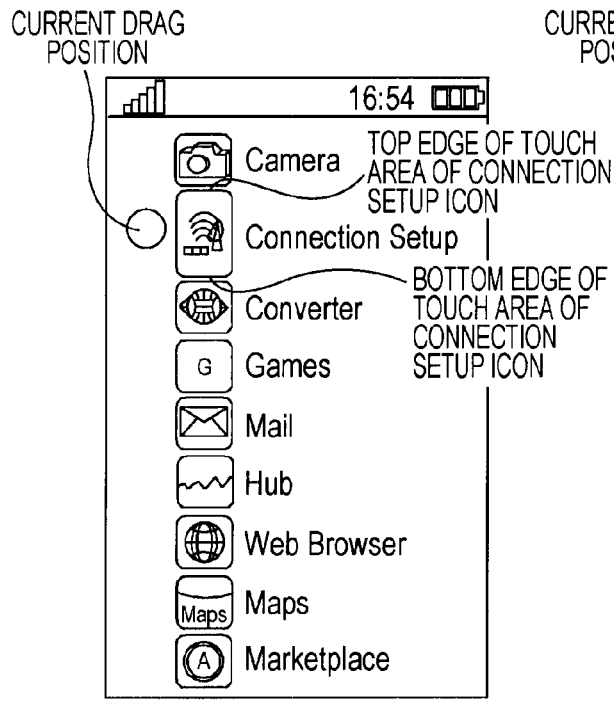
FIG. 17 includes schematic diagrams showing another example of the process of enlarging the touch area of an icon corresponding to a drag position in the cellular phone according to the embodiment.
Figure 17B:
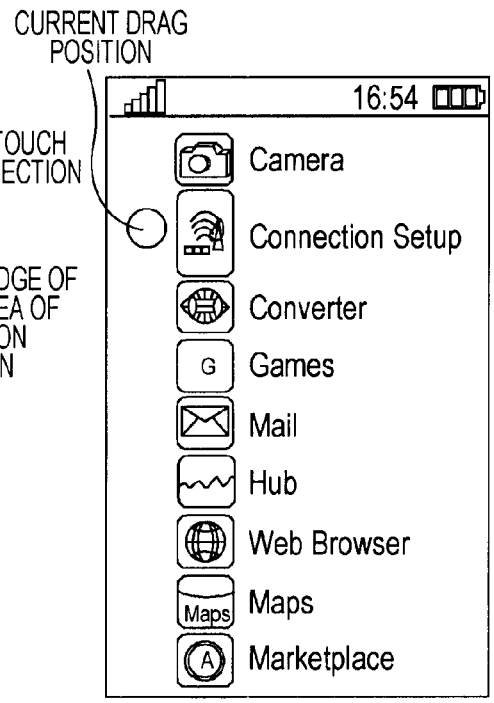

When the control unit 15 determines in step S86 that the position of the finger of the user is located between the top and bottom edges of the touch area of the icon of the connection setup, as shown in FIG. 17(a), it advances the process to step S89. It keeps the touch area of the icon of the connection setup larger than those of the other icons, as shown in FIG. 17(b).

Figure 17C:
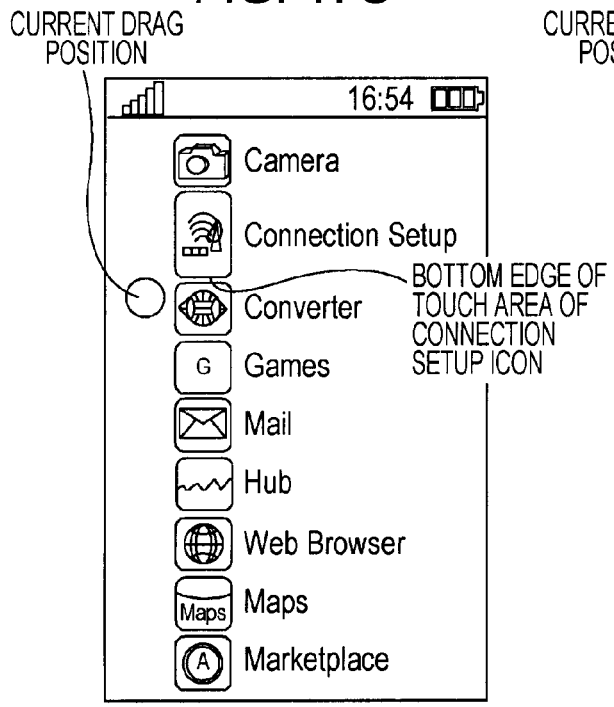
Figure 17D:
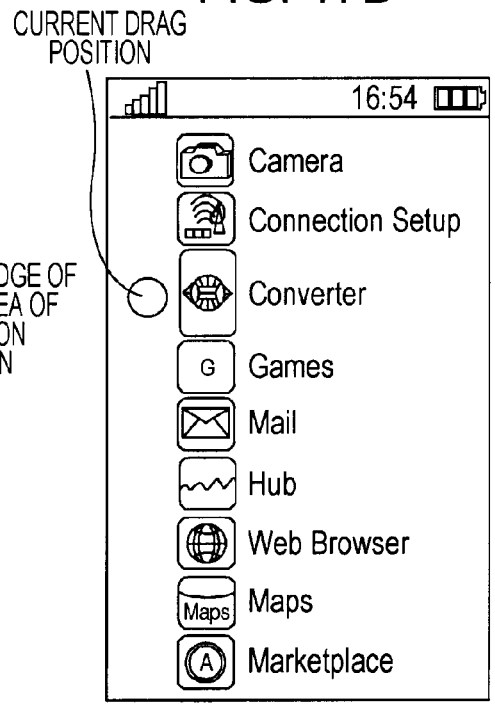

When the control unit 15 determines in step S87 that the position of the finger of the user is located below the bottom edge of the touch area of the icon of the connection setup, as shown in FIG. 17(c), it advances the process to step S90. As shown in FIG. 17(d), the control unit 15 restores the touch area of the icon of the connection setup to the normal size, as well as makes the touch area of an icon of a converter displayed below the icon of the connection setup larger than those of the other icons.

As seen, the control unit 15 enlarges only the touch area of an icon corresponding to the position of the dragged finger. Thus, it is possible to display many icons in the display area of the display unit 5 of limited size, as well as enlarge only the touch area of an icon which will be most probably operated by the user. This can facilitate an operation of each icon.

In the above description of the touch area enlargement process, the control unit 15 enlarges the touch area of the target icon without changing the size of the display area of each icon.

That is, the control unit 15 enlarges only the touch area of the target icon while leaving intact the size of the display area of each icon seen from the user.

Alternatively, the control unit 15 may enlarge both the display area and the touch area of the target icon. Thus, the apparent size of the display area of the target icon and the size of the touch area thereof are matched, making it easy for the user to recognize the touch area.

[Flow of Continuous Character Input]

Finally, the flow of the continuous character input process in the cellular phone according to this embodiment will be described.

Figure 18A:
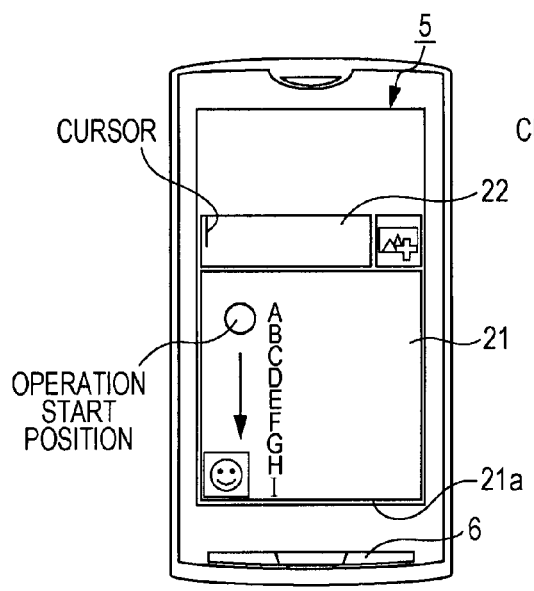
FIG. 18 includes schematic diagrams showing the flow of a series of character input processes in the cellular phone according to the embodiment.

In inputting desired characters, first, the user presses a desired position on the input area 21 of the display unit 5, as shown in FIG. 18(a). The control unit 15 displays alphabet characters in a line from the position pressed by the user toward the bottom edge 21a of the input area 21, as shown in FIG. 18(a).

While this example will be described assuming that alphabet characters are displayed, other characters such as hiragana characters may be displayed in the input area 21.

Figure 18B:
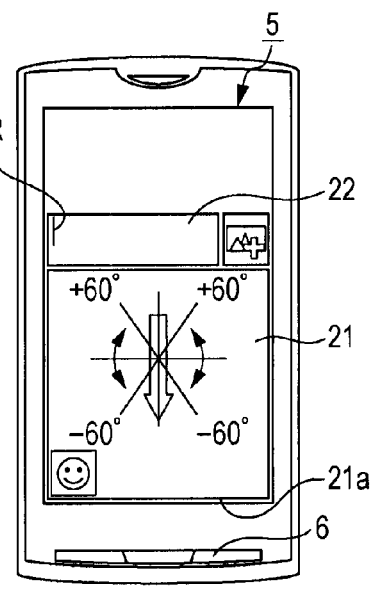

Next, as shown by the arrow in FIG. 18(a), the user drags the finger touching the input area 21 to the display position of a desired character. The user then bends the finger dragged to the display area of the desired character within the range of +60° to −60° of 180° on each of the left and right sides of the center line in the drag direction, as shown in FIG. 18(b).

When the finger is bent, the control unit 15 recognizes that the input of the character displayed in the position of the bending has been specified and displays the character corresponding to the bending in the text box 22 as an input-unconfirmed character.

Figure 18C:
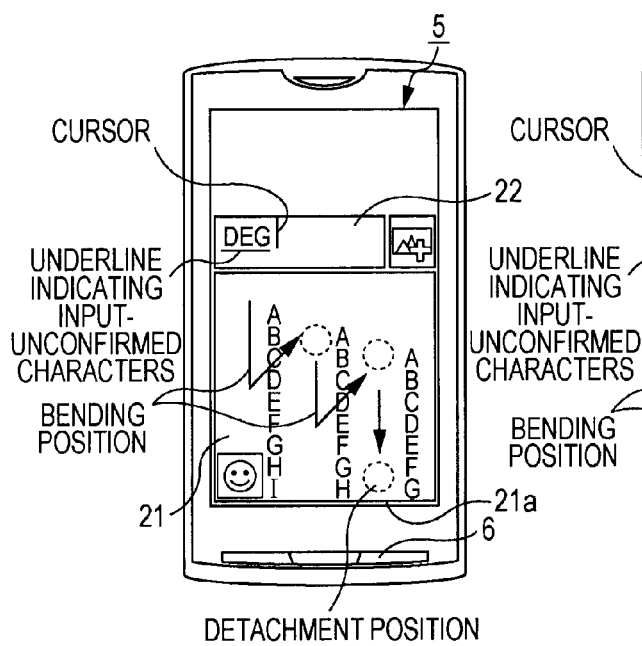

For example, FIG. 18(c) shows an example where the finger has been bent in the display position of the character "D." In this example, the control unit 15 displays the character "D" in the text box 22 as an input-unconfirmed character.

Alternatively, to input the desired character, the user may detach the finger dragged to the display position of the desired character from the input area 21. As described above, when the finger is detached, the control unit 15 recognizes that the input of the character displayed in the position of the detachment (that is, the position of the drag) has been specified and displays the character corresponding to the detachment in the text box 22 as an input-unconfirmed character.

The control unit 15 displays the character corresponding to the bending in the text box 22 and displays alphabet characters in a line from the position of the bending of the finger toward the bottom edge 21a of the input area 21, as shown in FIG. 18(c).

Subsequently, as shown by the arrow in FIG. 18(c), the user drags the finger to the display position of a desired character and bends it in the display position of the desired character. The control unit 15 then displays the character displayed in the position of the bending in the text box 22 as an input-unconfirmed character.

That is, FIG. 18(c) shows an example where the finger is bent in the display position of the character "D" and then bent in the display position of the character "E." In this example, the control unit 15 displays the character "E" next to the character "D" in the text box 22 as an input-unconfirmed character.

Subsequently, as shown in FIG. 18(c), the control unit 15 displays alphabet characters in a line from the position of the finger of the bending which has inputted the character "E" toward the bottom edge 21a of the input area 21.

As shown by the arrow in FIG. 18(c), the user drags the finger to the display position of a desired character and then detaches the finger from the input area 21 in the display position of the desired character. For example, as shown in FIG. 18(c), when the user detaches the finger from the input area 21 in the display position of the character "G," the control unit 15 displays the character "G" in the text box 22 as an input-unconfirmed character.

Figure 18D:
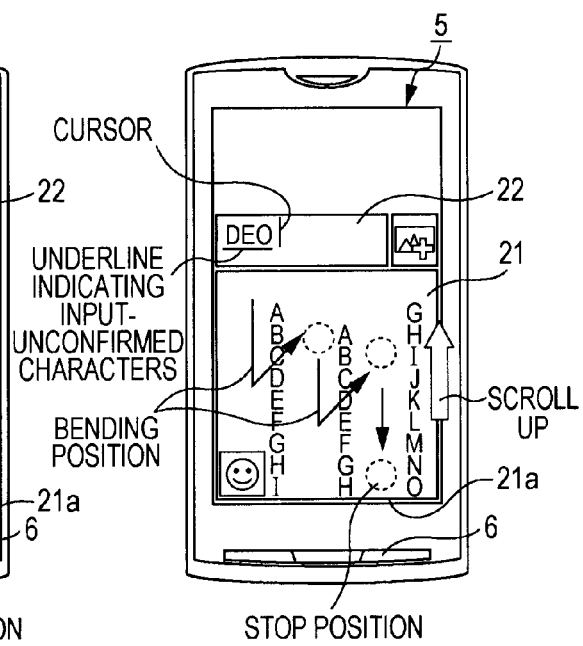

Alternatively, as shown in FIG. 18(d), after inputting the character "E," the user drags the finger to near the bottom edge 21a of the input area 21 and stops the finger. When the control unit 15 detects that the finger has stopped near the bottom edge 21a, it scrolls up the displayed alphabet characters, as shown in FIG. 18(d). Thus, characters such as "h," "I," "J," "K," and "L," which have not been displayed thus far, are sequentially scrolled up and displayed.

When a desired character is displayed due to this scroll-up, the user detaches the finger from the input area 21. Thus, the control unit 15 displays the character displayed in the position corresponding to the detachment in the text box 22 as an input-unconfirmed character.

Alternatively, as shown in FIG. 19(a), the user drags the finger to the display position of a desired character displayed due to the scroll-up and then detaches the finger from the input area 21 in the display position of the desired character. The control unit 15 displays the character displayed in the position corresponding to the detachment in the text box 22 as an input-unconfirmed character. For example, as shown in FIG. 19(a), when the user drags the finger to the display position of the character "P" and detaches the finger from the input area 21, the control unit 15 displays the character "P" next to the characters "D" and "E" in the text box 22 as an input-unconfirmed character.

Alternatively, as shown in FIG. 19(b), the user drags the finger to the display position of a desired character displayed due to the scroll-up and then bends it in the display position of the desired character. The control unit 15 then displays the character displayed in the position of the bending in the text box 22 as an input-unconfirmed character. For example, as shown in FIG. 19(b), when the user drags the finger to the display position of the character "S" and then bends it, the control unit 15 displays the character "S" next to the characters "D" and "E" in the text box 22 as an input-unconfirmed character.

After the control unit 15 displays the character "S" next to the characters "D" and "E" in the text box 22 as an input-unconfirmed character, it displays alphabet characters in a line from the position of the bending of the finger toward the bottom edge 21a of the input area 21, as shown in FIG. 19(c).

Meanwhile, when the user drags the finger to the display position of the character "S," the control unit 15 displays the character "S" next to the characters "D" and "E" in the text box 22 as an input-unconfirmed character, as shown in FIG. 19(b). However, when the finger of the user is located in the position of the bending which has inputted the second character, the character "E," due to the bending which has inputted the character "S," the control unit 15 deletes the third character, the character "S," and inputs the second character (in this example, the character "E") again.

The fact that the finger of the user is located in the position of the bending which has inputted the second character, the character "E," due to the bending which has inputted the third character, the character "S," means that the user has performed an operation in a direction opposite to the operation direction in which the input area 21 has been operated when inputting the character "E."

When the control unit 15 detects that an operation has been performed in a direction opposite to the operation direction in which the character has been inputted, it recognizes that the user wants to "redo the input." In this case, the control unit 15 deletes the third character, the character "S," and inputs the second character.

The user inputs a desired character as the second character again by dragging, detaching, stopping, and bending the finger on the input area 21 again.

In the above description, candidate alphabet characters for input are displayed in a line from the position of the finger of the user toward the bottom edge 21a of the input area 21. Alternatively, both the display form where alphabet characters are displays in a line from the position of the finger of the user toward the bottom edge 21a of the input area 21 and the display form where alphabet characters are displayed in a line from the position of the finger of the user toward the right edge or left edge of the input area 21 may be used.

In this case, as shown in FIG. 20(a), when the control unit 15 detects that the finger of the user has been stopped, e.g., for 500 msec after the finger is dragged to the display position of the character "D," it sequentially displays alphabet characters from the position of the finger of the user toward a right edge 21b of the input area 21. Alternatively, the control unit 15 may sequentially display alphabet characters from the position of the finger of the user toward a right edge 21c of the input area 21.

When the user drags the finger that has been stopped in the display position of the character "D," in the display direction of the characters displayed toward the right edge 21b of the input area 21, the above-mentioned bending is performed in the display position of the character "D." Thus, the control unit 15 recognizes that the input of the character "D" has been specified and displays the character "D" in the text box 22 as an input-unconfirmed character.

When the user stops the finger dragged in the display direction of the characters displayed toward the right edge 21b of the input area 21, for example, in the display position of the character "C," the control unit 15 sequentially displays alphabet characters from the display position of the character "C" on which the finger of the user stops, toward the bottom edge 21a of the input area 21.

When the user drags the finger that has been stopped in the display position of the character "C," in the display direction of the characters displayed toward the bottom edge 21a of the input area 21, the above-mentioned bending is performed in the display position of the character "C." Thus, the control unit 15 recognizes that the input of the character "C" has been specified and displays the character "C" next to the character "D" in the text box 22 as an input-unconfirmed character.

When the finger of the user is stopped near the bottom edge 21a of the input area 21, the control unit 15 sequentially scrolls up and displays characters which have not been displayed thus far, as shown by the hollow arrow in FIG. 20(b).

Likewise, when the finger of the user is stopped near the right edge 21b of the input area 21, the control unit 15 sequentially scrolls up and displays characters which have not been displayed thus far, from the right edge 21b of the input area 21 toward the left edge 21c thereof, as shown by the hollow arrow in FIG. 20(b).

As seen, use of both the display form where, to display candidate characters for input, the characters are displayed in a line from the position of the finger of the user toward the bottom edge 21a of the input area 21 and the display form where characters are displayed in a line from the position of the finger of the user toward the right edge or left edge of the input area 21 allows the user to input the desired characters by dragging the finger step-wise. Thus, characters can be inputted easily and quickly.

In the above example, alphabet characters are sequentially displayed even when displaying the second and later candidate characters for input. Alternatively, to display the second and later candidate characters for input, characters related to the previously inputted characters may be displayed as candidate characters for input.

Alphabet characters used in English, kana characters used in Japanese, and the like are concatenated in a statistically unbalanced manner. For this reason, once the preceding character is determined, the following character which will be most probably inputted can be predicted.

The control unit 15 refers to the word dictionary or the like stored in the memory 14 each time a character is inputted. Thus, it detects a character which will be most probably inputted next to the inputted character and displays the detected character as a candidate character for input.

For example, as shown in FIG. 20(c), when the finger of the user is stopped, e.g., for 500 msec after dragged to the display position of the character "D" in the first displayed alphabet character string, the control unit 15 detects characters which will be most probably inputted next to the character "D" by referring to the word dictionary or the like. The control unit 15 then displays the detected characters in the order of, e.g., "A," "D," "E," "H," "I," "O," "U," and the like, as shown in FIG. 20(c).

When the finger of the user which has stopped in the display position of the character "D" is dragged in the display direction of the candidate characters "A," "D," "E," "H," "I," "O," "U," and the like for input, the control unit 15 recognizes that the above-mentioned bending has been performed and displays the character "D" corresponding to the position of this bending in the text box 22 as the first input-unconfirmed character.

When the bent finger is stopped, for example, in the display position of the character "H," the control unit 15 detects characters which will be most probably inputted next to the character "H" with reference to the word dictionary or the like. The control unit 15 then displays the detected characters, for example, in the order of "A," "E," "I," "O," and the like, as shown in FIG. 20(c).

When the finger of the user which has stopped in the display position of the character "H" is dragged in the display direction of the candidate characters "A," "E," "I," "O," and the like for input, the control unit 15 recognizes that the above-mentioned bending has been performed and displays the character "H" corresponding to the position of this bending in the text box 22 as the second input-unconfirmed character.

Even in this case, when the finger of the user is stopped near the bottom edge 21a or right edge 21b of the input area 21, the control unit 15 sequentially scrolls up and displays characters which have not been displayed thus far, as shown in FIG. 20(d).

As seen, in displaying a candidate character string for input, a character which will be most probably inputted next to the previously inputted character is detected and displayed as a candidate character for input. Thus, it is possible to display only characters which will be most probably inputted by the user, without uselessly displaying characters which are less likely to be inputted by the user. Accordingly, the display area of the display unit 5 can be used effectively.

Further, since only characters which will be most probably inputted are displayed, the user can quickly find the desired characters and input them. Thus, characters can be inputted more easily and more quickly.

[Advantageous Effects of Embodiment]

As is apparent from the above description, the cellular phone according to this embodiment can obtain the following advantageous effects.

1. In inputting characters in the cellular phone according to this embodiment, the user presses a desired position on the input area 21 with a finger to display a candidate character string for input, drags the finger to the display position of a character desired to be inputted with the finger touching the input area 21, and detaches the finger from the input area 21 or bends the finger within a predetermined angle range. Thus, the character corresponding to the position in which the finger has been detached or bent is inputted.

That is, the user can input a desired character by easy operations such as a press, a drag, and detachment (or bending) on or from the input area 21. Thus, characters can be inputted easily and quickly.

2. In the cellular phone according to this embodiment, the user can input characters by pressing any position in the input area 21.

3. When the cellular phone according to this embodiment detects that a drag has been performed in a direction opposite to the direction of a drag performed when a desired character is inputted and thus detects that input specification such as the above-mentioned detachment or bending has been performed, it displays a character corresponding to the position of the input specification in the text box 22 instead of an inputted character displayed in the text box 22.

In this way, the user can replace an inputted character with a new desired character easily and quickly by simply dragging the finger in the opposite direction and specifying the input as described above.

4. When the cellular phone according to this embodiment detects a drag performed in a direction specifying the deletion of characters inputted in the text box 22, it sequentially deletes the inputted characters displayed in the text box 22 in accordance with the drag time, the drag length, or the drag pixel count. In this way, characters inputted in the text box 22 can be deleted easily and quickly by simply dragging the finger in a direction specifying the deletion of the inputted characters.

5. When the cellular phone according to this embodiment detects a stop of the above-mentioned drag, it displays characters related to a character corresponding to the stop position of the drag during the stop of the drag. This can assist the user in inputting characters, allowing the user to input characters more easily and more rapidly.

6. The cellular phone according to this embodiment makes only the touch area of a character corresponding to a drag position larger than the touch areas of the other characters without changing the size of the display area of the character corresponding to the drag position. Alternatively, the cellular phone according to this embodiment makes the display area and the touch area of a character corresponding to a drag position larger than the display areas and the touch areas of the other characters. This allows the user to input desired characters more easily. Thus, the user is allowed to input characters more easily and more quickly.

[Modification]

The above-mentioned embodiment is an example where the present disclosure is applied to a cellular phone. The disclosure is applicable not only to this cellular phone but also to the character input units of electronic apparatuses such as PHS (personal handyphone system) phones, PDA (personal digital assistant) devices, digital camera devices, digital video camera devices, portable game machines, and notebook or desktop personal computer devices. In any case, the same advantageous effects as those of the above-mentioned embodiment can be obtained.

The above-mentioned embodiment is only illustrative of the present disclosure. Accordingly, the present disclosure is not limited to the embodiment and various modifications, combinations, and other embodiments can be made in terms of the design or other elements without departing from the claims of the present disclosure or a scope equivalent to the claims. This will be naturally understood by those skilled in the art.

The invention claimed is:

1. An information processing apparatus comprising:
a display that receives a touch input;
a memory; and
circuitry configured to:
   determine a position of a touch input on the display;
   control the display to display a string of candidate characters for input at a position on the display corresponding to the position of the touch input;
   detect selection of a desired character from the string of candidate characters;
   control the display to display the desired character in a character input field on the display;
   determine that a drag touch is performed on the display at a position corresponding to the display sting of candidate characters;

determine whether a path of the drag touch input deviates within a predetermined angle range on a left of a path of the drag touch input;

in a case that the circuitry determines that the path of the drag touch input deviates within the predetermined angle range, determine a lastly displayed candidate character prior to a start of the deviation of the drag path; and control the display to display the lastly displayed candidate character prior to the start of the deviation of the drag as the desired character in the character input field on the display.

2. The information processing apparatus of claim 1, wherein a position of the touch input can be on any portion of the display.

3. The information processing apparatus of claim 1, wherein the circuitry is configured to control the display to display the string of candidate characters starting at a point corresponding to the position of the touch input.

4. The information processing apparatus of claim 1, wherein the circuitry is configured to determine a distance between the position of the touch input and a bottom edge of the display and compares the distance to a first predetermined threshold value.

5. The information processing apparatus of claim 4, wherein the circuitry is configured to control the displays all available candidate characters in the string of candidate characters when the distance is greater than the first predetermined threshold value.

6. The information processing apparatus of claim 4, wherein the circuitry is configured to compare the distance to a second predetermined threshold value when the distance is less than the predetermined threshold value.

7. The information processing apparatus of claim 6, wherein the circuitry is configured to control the display to display a subset of all available candidate characters in the string of candidate characters in a case that the distance is greater than the second predetermined threshold value.

8. The information processing apparatus of claim 1, wherein the circuitry is configured to detect selection of the desired character from the string of candidate characters in a case that the touch input is released at a position corresponding to the desired character.

9. The information processing apparatus of claim 1, wherein the circuitry is configured to determine that a drag touch input is performed on the display in a first direction at a position corresponding to the displayed string of candidate characters, and controls the display to display characters from the string of candidate characters in the character input field based on a current position of the drag touch input.

10. The information processing apparatus of claim 9, wherein the circuitry is configured to determine that a drag touch input is performed on the display in a second direction opposite to the first direction and replaces a character displayed in the character input field based on a current position of the drag touch input.

11. The information processing apparatus of claim 1, wherein the predetermined angle range is ±60°.

12. The information processing apparatus of claim 1, wherein the circuitry is configured to:

sequentially delete a plurality of selected characters displayed in the character input field incrementally in accordance with a drag time of the drag input; and sequentially repopulate the sequentially deleted plurality of selected characters in the character input field incrementally in accordance with a drag time of the drag touch input.

13. The information processing apparatus of claim 1, wherein the circuitry is configured to:

determine that a drag touch input is performed in a first direction in the character input field and sequentially deletes each of a plurality of individual selected characters displayed in the character input field incrementally in accordance with one of a drag time, a drag length and a drag pixel count of the drag touch input;

store each of the sequentially deleted plurality of individual selected characters in the memory in the order in which they were sequentially deleted; and determine that a drag touch input is performed in a second direction, which is opposite to the first direction, in the character input field and sequentially repopulates each of the sequentially deleted plurality of individual selected characters in the character input field incrementally in accordance with one of a drag time, a drag length and a drag pixel count of the drag touch input.

14. The information processing apparatus of claim 1, wherein the circuitry is configured to control the display to display another string of candidate characters for input at another position on the display corresponding to a position of the touch input after the deviation of the drag path.

15. The information processing apparatus of claim 1, wherein the deviation of the drag path is performed as a bending operation on the display.

16. The information processing apparatus of claim 1, wherein the last position prior to the start of the deviation of the drag path is a bending position of the drag path.

17. An information processing method performed by an information processing apparatus, the method comprising:

determining, using circuitry of the information processing apparatus, a position of a touch input received at a display of the information processing apparatus;

controlling, the display to display a string of candidate characters for input at a position on the display corresponding to the position of the touch input;

detecting, selection of a desired character from the string of candidate characters;

controlling, the display to display the desired character in a character input field on the display;

determining that a drag touch input is performed on the display at a position corresponding to the displayed string of candidate characters;

determining whether a path of the drag touch input deviates within a predetermined angle range on a left or right side of a path of the drag touch input;

in a case that the path of the drag touch input is determined to deviate within the predetermined angle range, determining a lastly displayed candidate character prior to a start of the deviation of the drag path; and controlling the display to display the lastly displayed candidate character prior to the start of the deviation of the drag path as the desired character in the character input field on the display.

18. A non-transitory computer-readable medium including computer program instructions, which when executed by an information processing apparatus, cause the information processing apparatus to perform a method comprising:

determining a position of a touch input received at a display of the information processing apparatus;

controlling the display to display a string of candidate characters for input at a position on the display corresponding to the position of the touch input;

detecting selection of a desired character from the string of candidate characters;

controlling the display to display the desired character in a character input field on the display;

determining that a drag touch input is performed on the display at a position corresponding to the displayed string of candidate characters;

determining whether a path of the drag touch input deviates within a predetermined angle range on a left or right side of a path of the drag touch input;

in a case that the path of the drag touch input is determined to deviate within the predetermined angle range, determining a lastly displayed candidate character prior to a start of the deviation of the drag path; and controlling the display to display the lastly displayed candidate character prior to the start of the deviation of the drag path as the desired character in the character input field on the display.

* * * * *